US010688591B2

(12) United States Patent
Hirsch

(10) Patent No.: US 10,688,591 B2
(45) Date of Patent: Jun. 23, 2020

(54) SAFETY SENSOR FOR A WELDER

(71) Applicant: Roger Barry Hirsch, Evanston, IL (US)

(72) Inventor: Roger Barry Hirsch, Evanston, IL (US)

( * ) Notice: Subject to any disclaimer, the term of this patent is extended or adjusted under 35 U.S.C. 154(b) by 581 days.

(21) Appl. No.: 15/347,578

(22) Filed: Nov. 9, 2016

(65) Prior Publication Data

US 2017/0129043 A1    May 11, 2017

Related U.S. Application Data

(60) Provisional application No. 62/253,088, filed on Nov. 9, 2015.

(51) Int. Cl.
  *B23K 11/25*   (2006.01)
  *B23K 37/00*   (2006.01)
  *B23K 11/11*   (2006.01)

(52) U.S. Cl.
  CPC ............. *B23K 11/25* (2013.01); *B23K 11/115* (2013.01); *B23K 37/006* (2013.01)

(58) Field of Classification Search
  CPC .... B23K 11/258; B23K 11/115; B23K 37/006
  USPC ........................................................ 219/110
  See application file for complete search history.

(56) References Cited

U.S. PATENT DOCUMENTS

| | | | | |
|---|---|---|---|---|
| 4,041,272 A | * | 8/1977 | Burton | B23K 11/255 219/89 |
| 5,449,877 A | * | 9/1995 | Buda | B23K 11/252 219/110 |
| 6,469,856 B1 | * | 10/2002 | Mitchell | G11B 20/10009 360/46 |
| 2008/0302766 A1 | * | 12/2008 | Hirsch | B23K 11/115 219/108 |
| 2015/0352654 A1 | * | 12/2015 | Onishi | B23K 11/115 219/130.01 |

\* cited by examiner

*Primary Examiner* — Ibrahime A Abraham
*Assistant Examiner* — John J Norton
(74) *Attorney, Agent, or Firm* — Brinks Gilson & Lione

(57) ABSTRACT

A continuity sensor determines continuity between welding electrodes by detecting a change in a voltage of a sensed tracer signal across the electrodes from a time when a weld cycle is initiated to a time when the electrodes contact material to be welded. As the electrodes are brought together with low force, the continuity sensor detects changes in the sensed voltage level exceeding a threshold thereby representing continuity and enables the welder to apply the higher welding force. However, if the continuity sensor does not detect a change in the voltage signal, then the welder will not apply the full welding force, thereby preventing pinch-point injury to the operator. The digital continuity sensor reestablishes a baseline for detecting the change in voltage with every new weld cycle such that the digital continuity sensor is not subject to changing voltages or changes in the welder configuration.

20 Claims, 15 Drawing Sheets

SAFETY SENSOR FOR A WELDER

CROSS-REFERENCE TO RELATED APPLICATION

This application claims the benefit of U.S. Provisional Application No. 62/253,088, filed Nov. 9, 2015, the entirety of which is hereby incorporated herein by reference.

TECHNICAL FIELD

The present disclosure relates to a safety system for a welder, and more particularly, to pinch point safety systems for resistance welders.

BACKGROUND

1. Need for Pinch-Point Protection

Operators of resistance (spot) welding machines are often exposed to potentially serious injury due to the pinch point area between the welding electrodes. A typical resistance welder operates with electrode forces of 250 lbs to 5,000 lbs and higher. Because the force is concentrated on a very small contact surface of the electrode, the force density is extremely high and can easily cause permanent finger injury or total amputation.

For example, on a welder with 600 lbs of electrode force and a ¼" contact surface, the force density at the pinch point is 12,229 lb/in². Because a common application of a resistance welding machine requires the operator to load parts between the electrodes as well as keep their hands on these parts during the welding sequence, the possibility for serious injury is present on a daily basis. A device according to the present disclosure eliminates serious pinch-point injury by reducing the force between electrodes to a very low level when the operator's finger or other body part is between the electrodes.

2. Prior Art

A typical prior art arrangement will be described with reference to FIGS. 1 to 4. In one form of the prior art arrangement used on direct action welders ("press welders") and shown in FIG. 1, a limit switch 1 is mounted on a fixed portion of the resistance-welding machine frame 2 and wired to the welder's control circuitry 3. An adjustable finger 4 is mounted on the moving ram 5 and is adjusted so that the limit switch closes only after the ram has lowered to the point where space between the electrodes 6 is below the desired dimension (typically about ¼"). After the initiation switch has been closed, the welder's ram 5 falls by gravity, or has some other mechanism to restrict force between the electrodes until the limit switch 1 has closed. The control circuitry 3, then turns another output on to place full welding force between the electrodes 6.

A second form of the prior art arrangement is used on rocker arm type welders and shown in FIG. 2. Force at electrodes 6 is derived from the force out of the rear piston multiplied by the mechanical advantage of arms C/B. A limit switch 7 for this prior art device is mounted on a fixed portion of the welder frame 2, and an adjustable finger 8 is installed on some portion of the welder's moving cylinder mechanism 9. This finger 8 is adjusted so that the limit switch 7 closes only after the electrodes 6 have closed to the point where space between them is below the desired dimension (typically about ¼"). The control then turns another output on to place full welding force between the electrodes 6.

However in both of the above prior arrangements, setting of the limit switch finger 4 or 8 is done by the operator or setup person, and the accuracy of this setting is fully in the hands of this person's skill. Furthermore, if the electrodes 6 are moved during normal production or subsequent electrode replacement or adjustment, and the limit switch is not adjusted properly, the safety of the system is compromised.

A third form of the prior art arrangement, as shown in FIG. 3, utilizes a system actuated by a motor 9 to close a limit switch 11 (or limit switch cam). During a setup sequence, an air cylinder is activated to bring the electrodes 6 together. Then the motor 9 moves the switch 11 or cam until the switch is closed by the cam, and then backs it up until a specific dimension (typically about ¼") has been reached. During each welding sequence, electrodes 6 are moved together under reduced force until the limit switch 11 has been closed. The control then turns another output on to place full welding force between the electrodes 6.

This prior art allows automatic setting of the correct spacing between electrodes 6. However, in this third prior art arrangement, proper setting of the cam is mechanical and subject to mechanical adjustment errors. Additionally, as with the first two forms, if the electrodes 6 spacing is changed during normal production or subsequent electrode replacement or adjustment, and the operator does not remember to reset the finger the safety of the system is compromised.

A fourth form of the prior art arrangement, as shown in FIG. 4, utilizes a mechanically or pneumatically moved sensing arm (sometimes called "ring guard") 11. When the welder is energized during each welding cycle, the electrodes 6 do not move forward, but this sensing arm 11, lowers to touch ring 11 a to the part 12 being welded. Sensing arm 11 is mechanically designed to encompass the area around the electrodes 6. If the distance traveled is past the set point on a limit switch 13, the sensing arm 11 will retract and the electrodes 6 will be closed under full welding force. If ring 11 a on the sensing arm 11 does not move this minimum set distance, as would happen when the operator's finger or other body part is under ring 11 a the sensing arm 11 will retract but the welder control will not cause the electrodes 6 to close.

However, in this fourth prior art arrangement if the welder operator or setup person does not adjust the sensing arm 11 properly, high force can be applied between the welding electrodes 6 even though the operator's finger or other body part is between the electrodes. Further, just bending this sensing arm 11 out of the proper sensing zone renders this system totally useless.

SUMMARY OF THE INVENTION

In order to address pinch point protection for welding machines including resistance-welding machines, a safety sensor is disclosed below. The safety sensor monitors continuity between the welding electrodes when the welding machine has been initiated and during closure of the electrodes under low force. The safety sensor prevents application of high electrode force between the electrodes if the continuity measured does not change at least by a threshold amount indicating contact with a low-impedance material for welding. The result is a passive system that prevents application of high electrode force that can cause serious pinch-point injury to the operator of the welder.

DETAILED DESCRIPTION

A system and method to provide a pinch point sensing device is described below. According to one aspect, a passive sensing system will only allow high electrode force to be applied between welding electrodes if continuity between the electrodes has been detected, whereby the electrodes will clamp only on any low-resistance material, but will not clamp on a high-resistance material such as an operator's finger or other body part. In another aspect, internal sensing of continuity between the welding electrodes can be independent of operator adjustments and can be independent of electrode position to protect the pinch point area even if spacing between the electrodes is changed. In another aspect, switching from low to high electrode force permits limiting electrode force prior to continuity detection and provides pinch point protection.

A resistance-welding machine according to different embodiments will be described with reference to FIGS. 5 through 23.

Figure 5:
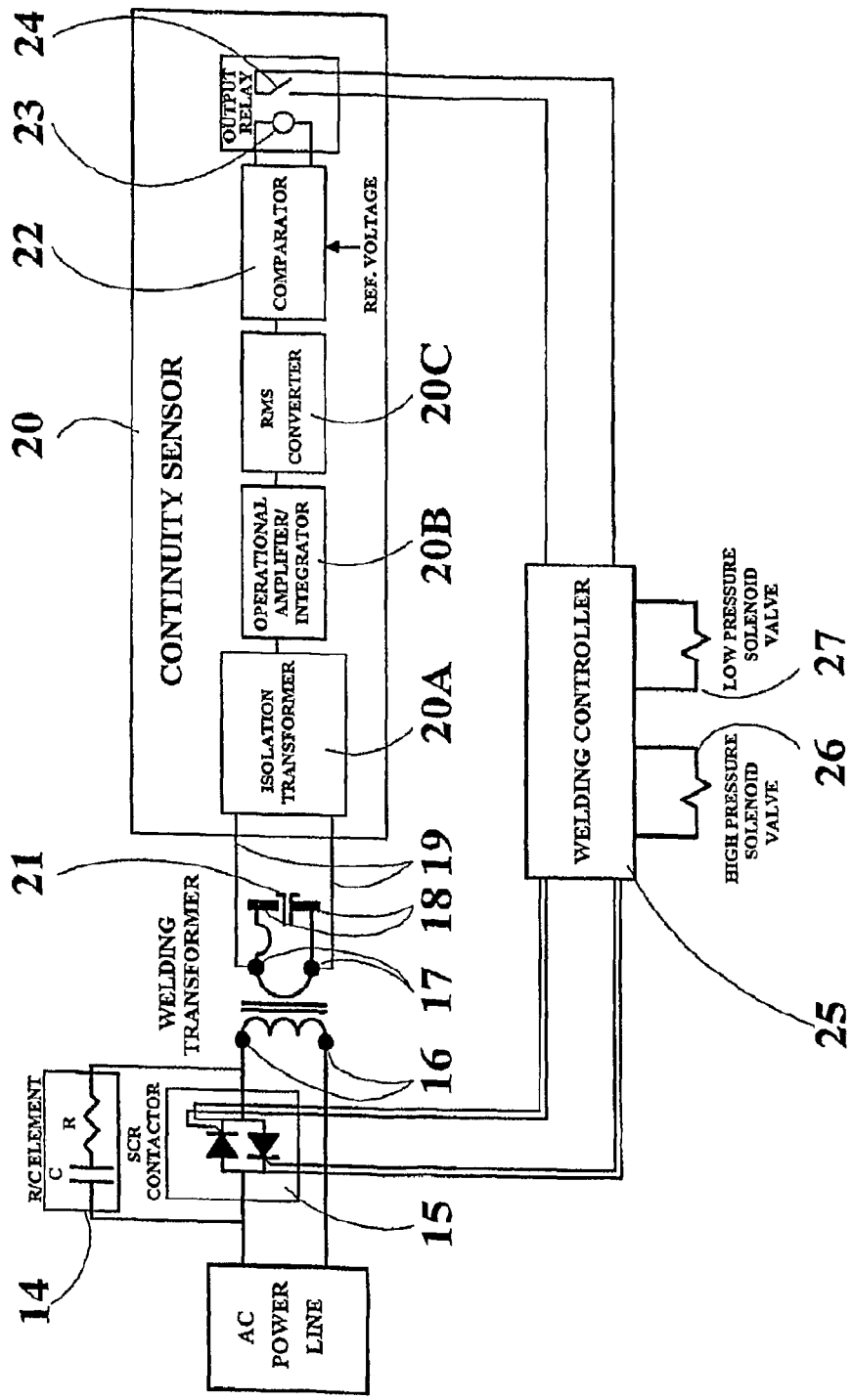
FIG. 5 is a block diagram of a system in accordance with various embodiments using a continuity sensor where the sensor signal is obtained from the secondary (low voltage) side of the welding transformer.

FIG. 5 shows the electronic diagram of a typical resistance-welding machine that has only a continuity sensor 20 as the detection system, in accordance with various embodiments. When the welding electrodes 18 are not in contact, a low voltage leakage voltage is developed by a bypass element 14, which may be a resistor/capacitor element 14, connected across a contactor 15, which may be a silicon controlled rectifier (SCR) contactor, to put a low voltage signal on the welding transformer's primary side 16. In one approach, this low voltage signal is considered a tracer signal and the bypass element 14 is considered a tracer signal injector. In one embodiment, the bypass element 14 generates or develops the low voltage signal on the welding transformer's primary side 16, which is a fraction of the line voltage provided to the welding machine, continuously and without interruption (e.g., by relays or other switches) during operation whenever the welding machine is connected to power by being connected to the incoming power signal, which may be an alternating-current single phase or multi-phase (e.g., three-phase) power source. For example, the bypass element 14 may be an active or passive element and may pass an attenuated signal corresponding to the input line voltage. In so doing, the bypass element electrically couples the low voltage signal across the electrodes 18 through the welding transformer.

The continuity sensor 20 may also include an isolation transformer 20A, an operational amplified/integrator 20B and a root mean square (RMS) converter 20C, as shown in FIG. 5.

This voltage is transmitted inductively to the welding transformer's secondary 17 and to the welding electrodes 18. A pair of wires 19 or contacts are connected across the welding transformer's secondary 17, ideally at the points closest to the transformer's output keep the sensor wires out of the mechanical area of the welder, and to the input of the continuity sensor 20.

During a welding sequence, the welding controller 25 energizes low-pressure solenoid valve, 27. The welding electrodes 18 are now brought together under low force by the welding controller. If these welding electrodes 18 contact low-resistance metal to be welded, impedance of the welder secondary 17 is lowered.

Since available current from R/C element 14 is very low, the lowered impedance of the secondary 17 greatly reduces voltage from this R/C element on the transformer primary 16 to inductively reduce voltage on transformer secondary 17. This lowered voltage at secondary 17 is transmitted through wires 19 to the input of continuity sensor, 20. The first stage of continuity sensor 20 conditions this input voltage. The continuity sensor 20 may include an isolation transformer 20A, an operational amplifier/integrator 20B, and an RMS converter 20C. The conditioned voltage is fed into comparator 22. If this conditioned input voltage level goes below the comparator's reference voltage relay 23 is energized. Normally open contacts 24 on this relay are closed to signal welding controller 25 that continuity has been detected between the electrodes 18.

Adjustment of the internal reference voltage will match electrical response of the welder to close and open electrode conditions for different types of welders. At this time, logic in welding controller 25 energizes solenoid valve 26 to put full welding force between welding electrodes 18. However, if this conditioned reference voltage fails to go below the reference voltage of comparator 22 within a time limit, controller 25 releases low-pressure solenoid valve 27, and electrodes 18 open without ever reaching full force. At the same time, a diagnostic can be displayed on welding controller 25.

Figure 6:
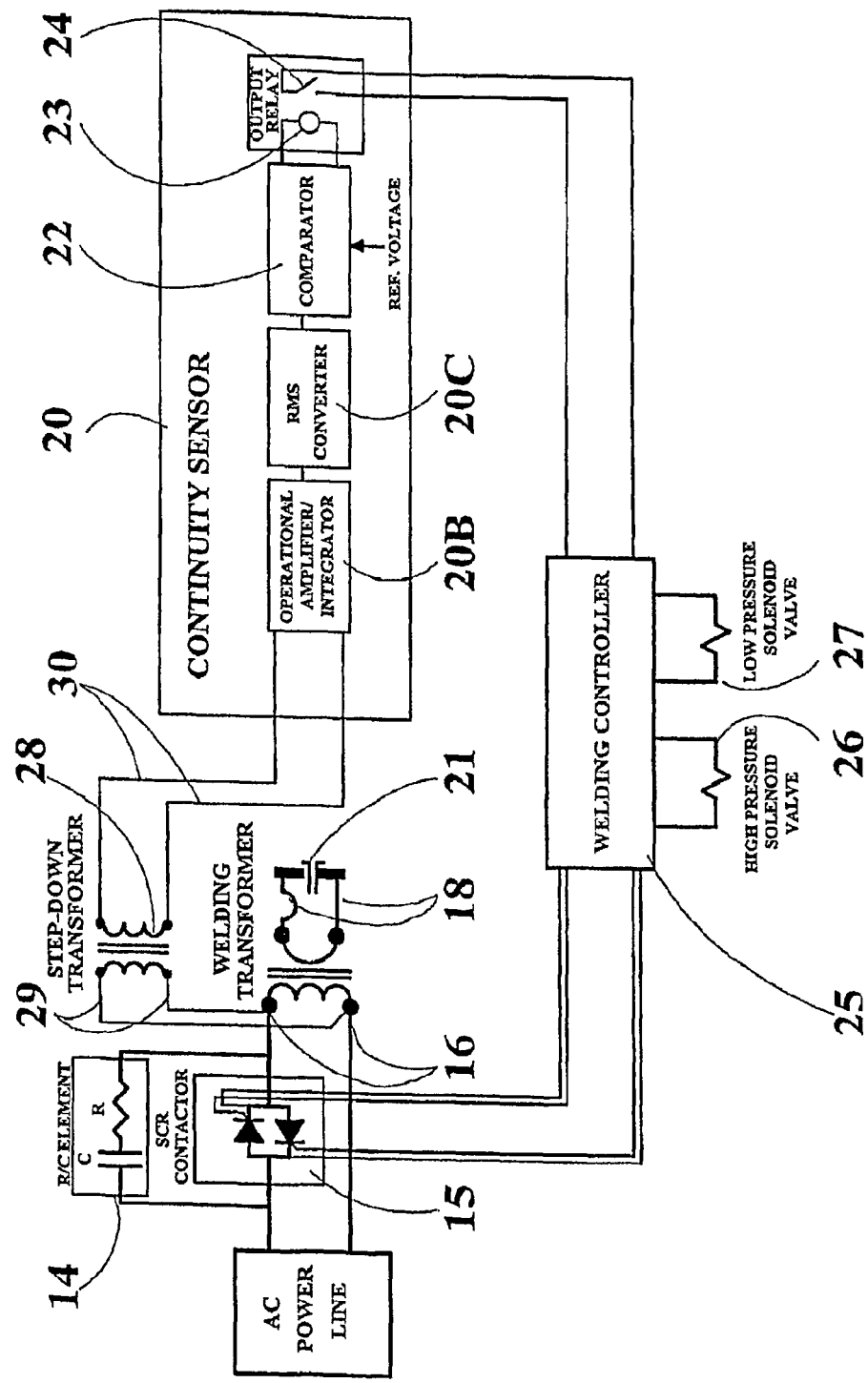
FIG. 6 is a block diagram of a system in accordance with various embodiments using a continuity sensor where the sensor signal is obtained from the primary (high voltage) side of the welding transformer which may be used for welders that have remote welding guns with integral transformers such as transguns.

Alternately, as shown in FIG. 6, a voltage parallel to the welding transformer's primary 16 is connected by wires 29 to a step-down transformer 28 and then to the input of the continuity sensor with wires 30. The circuitry of the continuity sensor 20 conditions this input signal to eliminate extraneous voltage and prevent high welding (or line) voltage from damaging the low-level circuitry in the system's comparator 22. Similar to FIG. 5, the continuity sensor 20 may also include an operational amplified/integrator 20B and a RMS converter 20C, as shown in FIG. 6.

During a welding sequence, the welding controller 25, energizes low-pressure solenoid valve 27. If welding electrodes 18 contact low-resistance metal 21 being welded, impedance of the welding transformer's secondary is greatly lowered. Since the available current from the R/C element 14 is very low, the lowered impedance of the transformer's secondary reduces voltage from this R/C element on the transformer primary 16. This lowered and isolated voltage is transmitted through wires 29 through a step-down transformer 28 and to input of the continuity sensor 20.

The first stage of the continuity sensor 20, conditions this input voltage. The conditioned voltage is fed into a comparator 22. If this conditioned input voltage level goes below the reference voltage of the comparator 22, relay 23 is energized. Normally open contacts 24 on this relay 23 are closed to signal the welding controller 25 that continuity has been detected between the electrodes 18.

Adjustment of the internal reference voltage will match electrical response of the welder to close and open electrode conditions for different types of welders. At this time, logic in the welding controller energizes a high pressure solenoid valve 26 to put full welding force between welding electrodes 18. However, if this conditioned reference voltage fails to go below the reference voltage of the comparator 22 within a time limit, the controller 25 releases low-pressure solenoid valve 27, and the electrodes 18 open without ever reaching full force. At the same time, a diagnostic can be displayed on the welding controller 25.

Figure 7:
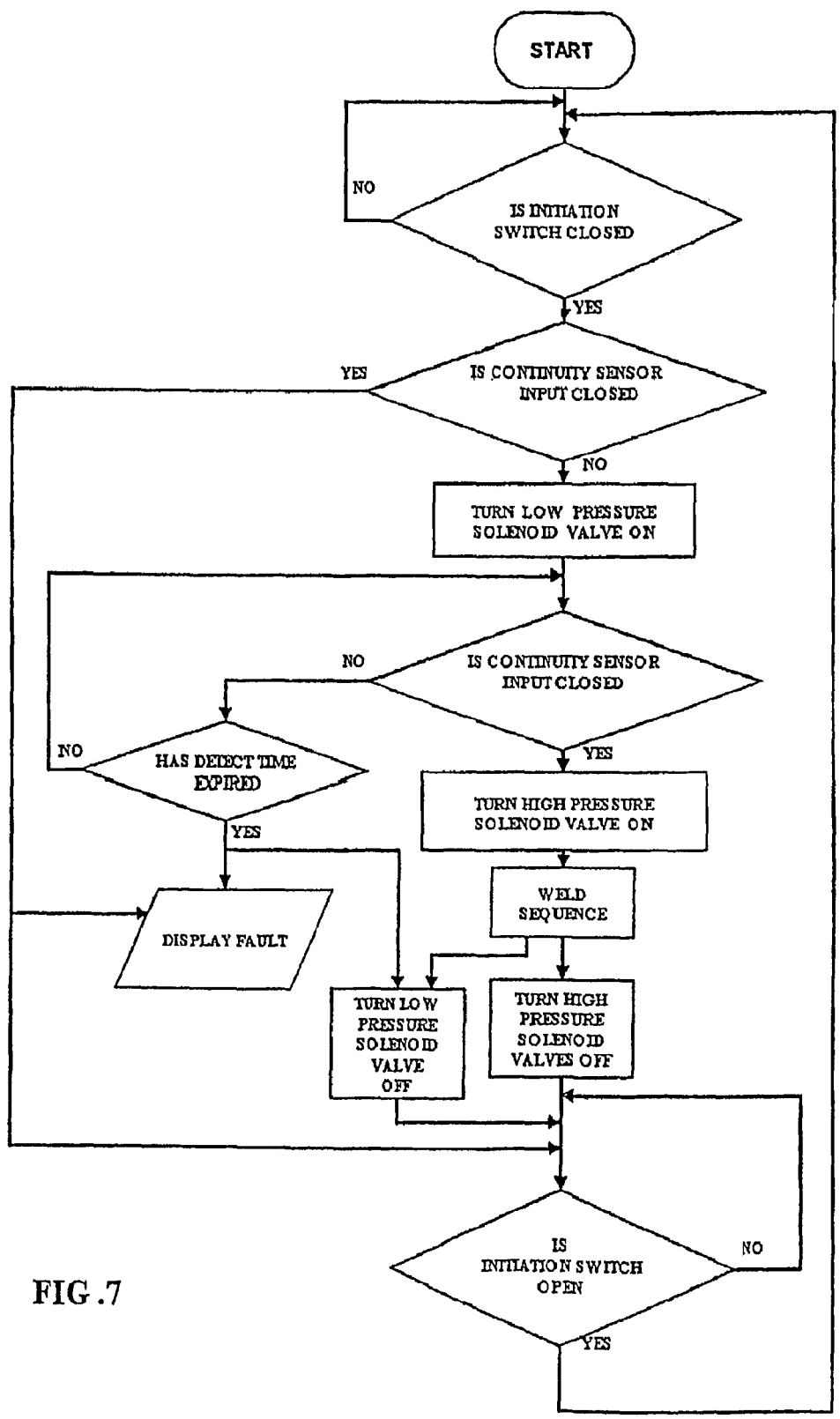
FIG. 7 is a flow chart showing example control logic for the block diagram of FIGS. 5 and 6, when a continuity sensor system is used, in which case the continuity sensor must be closed for the system to allow high welding force to be applied in accordance with various embodiments.

FIG. 7 shows the logic sequence for a welder using the electronic diagram of FIGS. 5 and 6, in accordance with various embodiments. After the welder's initiation switch has been closed, the control checks to see if continuity sensor output relay contact 24 that is connected to the control "continuity sensor input" has closed.

Sequences of Operation (FIG. 5 and FIG. 6 Embodiment)

Sequence 1: Continuity sensor input is not closed at start: The control turns on the low-pressure solenoid valve 27 to bring the electrodes closed under low force. The control continues to monitor the continuity sensor input.

Sequence 1a: If the continuity sensor input is not closed within the selected maximum set detect time, the low-force solenoid valve 27 is turned off to open the electrodes, a display fault is shown on the control, and the system locks out until the initiation switch has been opened.

Sequence 1b: If the continuity sensor input closes before the selected detect time has elapsed, the high-force solenoid valve 26 is closed to put full force on the electrodes 18. The control then goes through the weld sequence and finally turns off both solenoid valves 26 and 27 to release the electrodes 18.

Sequence 2: Continuity sensor input is closed at the start. Because this indicates a failure of the continuity sensor 20, a faulty setting of the continuity sensor board, an incorrect setting of the reference voltage, or a short in the detector wires (19 in FIG. 5, 29 in FIG. 6), the controller 25 does not energize the low-force solenoid valve 27 and locks out waiting for the initiation switch to be opened before allowing the next attempted cycle. At the same time, a fault indication is shown on the display.

Figure 8:
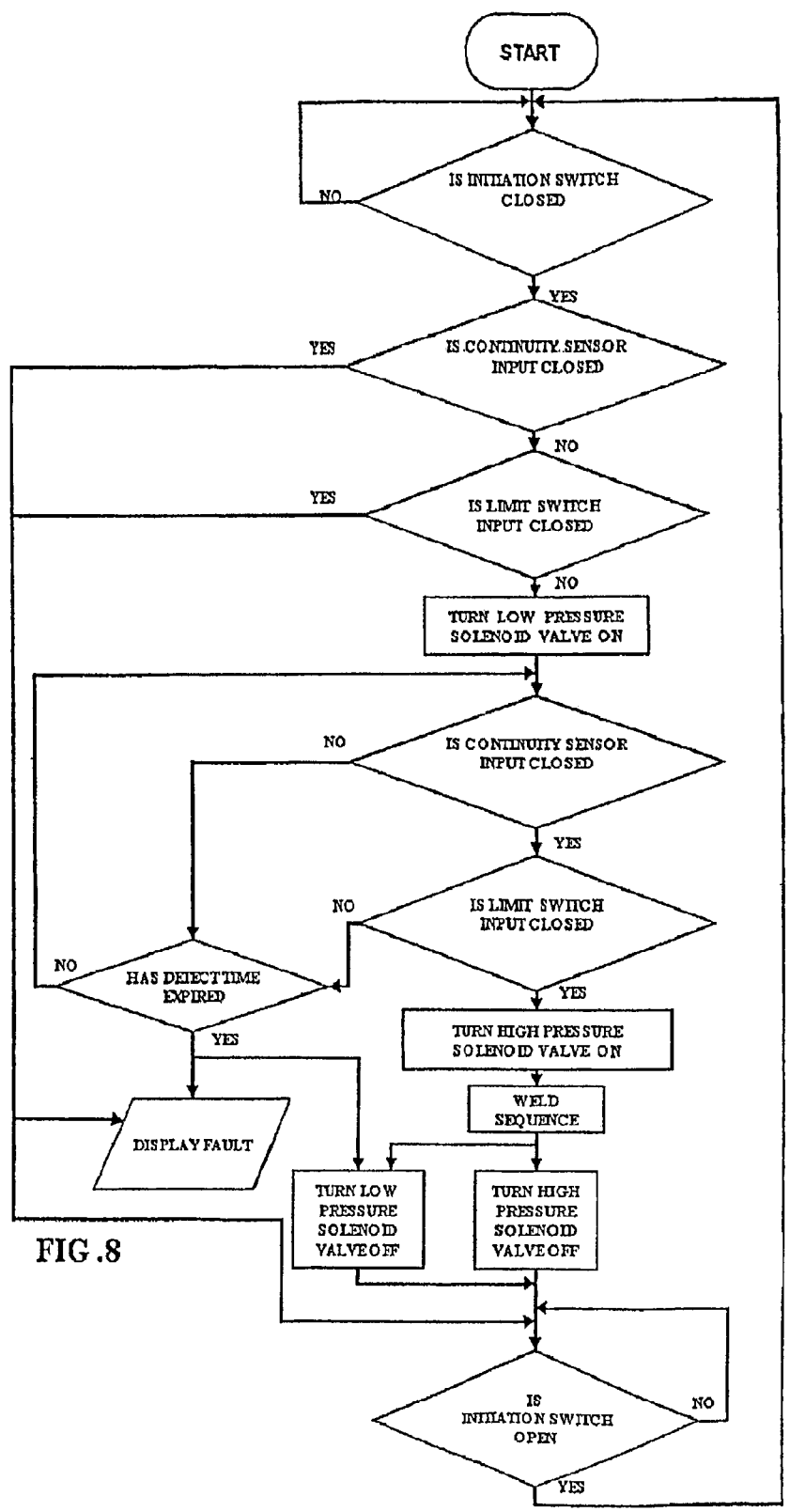
FIG. 8 is a flow chart showing example control logic for the block diagram of FIGS. 5 and 6, when both a continuity sensor and a limit switch system is used, so that both the continuity sensor and the limit switch must be closed for the system to allow high welding force to be applied, in accordance with various embodiments.

FIG. 8 shows a flow chart for an alternate logic sequence that requires the detection of continuity as illustrated above plus closing of a ram-position limit switch before allowing full electrode force. This arrangement is typically used for welding of parts that are not flat at the beginning of the welding sequence, or where a redundant sensor is desired.

Figure 1:
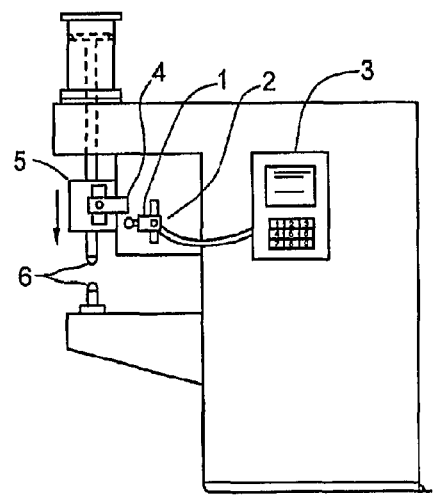
FIGS. 1-4, as previously discussed, illustrate prior art systems attempting to provide suitable pinch point protection for welding machines.

The limit switch, like that shown in FIG. 1, is mechanically adjusted so that a cam will close this limit switch if electrodes 6 are closer than a desired dimension (typically about ¼"). The same logic can be used on rocker arm welders using limit switch 7 and adjustable finger 8 in FIG. 2; and a motorized set limit switch 11 like that shown in FIG. 3 may been used.

The logic chart shown in FIG. 8 shows an example of a logic sequence with this second detection element, in accordance with various embodiments. After the welder's initiation switch has been closed, the control checks to see if both the continuity sensor input and the limit switch contacts have been closed.

Sequences of Operation (FIG. 8 Embodiment)

Sequence 1: Neither continuity sensor nor limit switch contact closure is detected at start: The control turns on the low-pressure solenoid valve to bring the electrodes closed under low force. The control continues to monitor both input signals.

Sequence 1a: If contact closure from both the continuity sensor and the limit switch are not detected within the predetermined selected detect time, the low-force solenoid valve is turned off to open the electrodes, a display fault is shown on the control, and the system locks out until the initiation switch has been opened.

Sequence 1b: If contact closure from both the continuity detector and the limit switch is detected before the detect time has elapsed, the high-force solenoid valve is energized to put full force on the electrodes. The control then goes through the weld sequence and finally turns off both solenoid valves to release the electrodes.

Sequence 2: Contact closure from either one or both inputs is detected at the start. Because this indicates a continuity circuit failure or faulty setting of the reference voltage, a short in the detector wires, or an improperly set or permanently closed limit switch, the control does not energize even the low-force solenoid valve and locks out waiting for the initiation switch to be opened before allowing the next attempted cycle.

Digital Continuity Sensor

Figure 20:
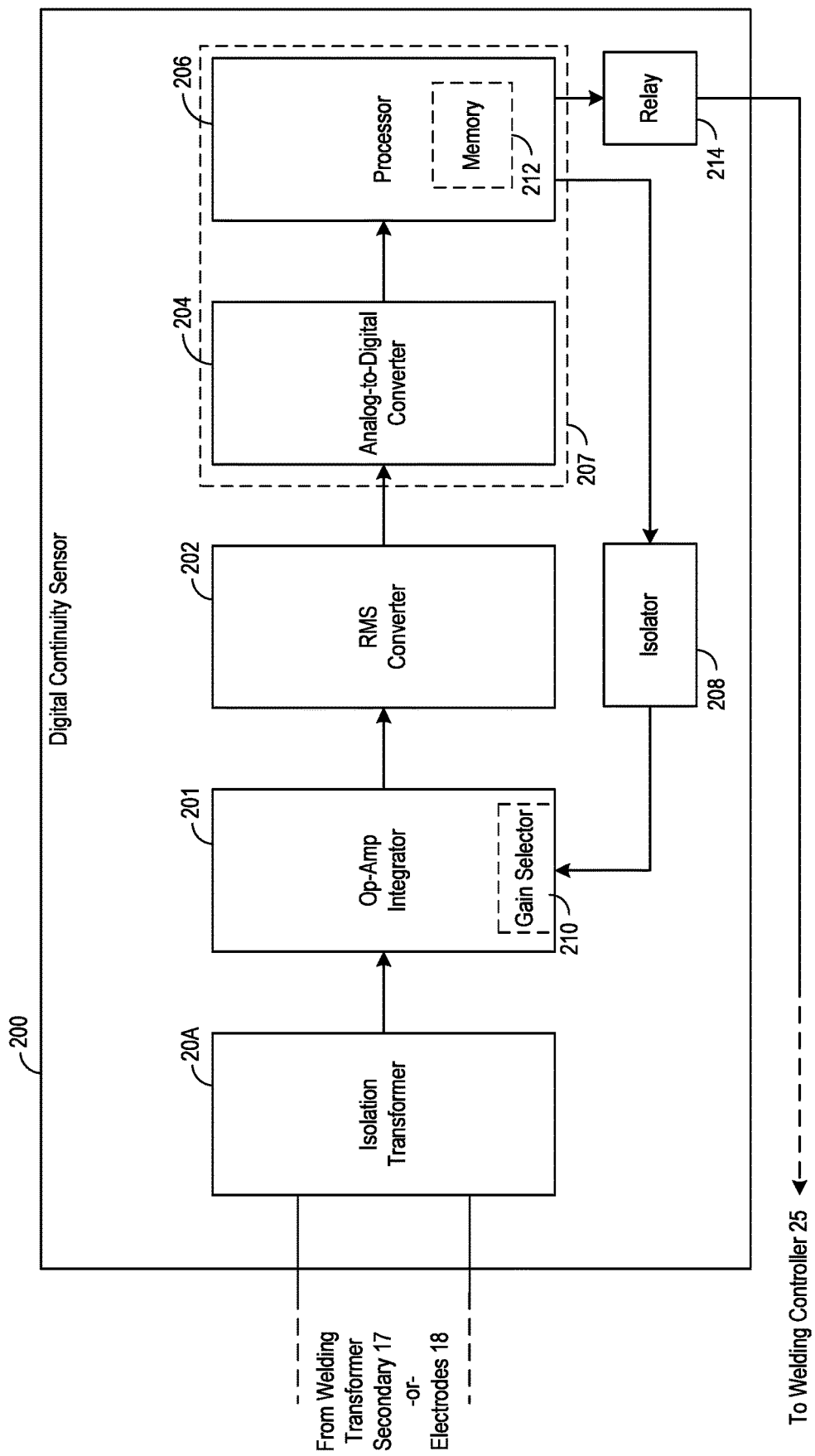
FIG. 20 is a block diagram of a digital continuity sensor in accordance with various embodiments.

Turning now to FIG. 20, a digital continuity sensor 200 is now described in accordance with various embodiments. The digital continuity sensor 200 incorporates improvements to the above-described continuity sensor 20 to provide added features. For example, in the above-described continuity sensor 20, the input sense voltage signal is conditioned and then fed into one port of a comparator 22. The other port of the comparator 22 has a reference voltage that is fixed (though which may be manually calibrated, for example, with a potentiometer). In the above-described continuity sensor 20, if the conditioned input sense voltage level drops below the fixed reference voltage, the output of the comparator 22 goes negative and the output relay 23 closes to indicate to the welding controller 25 to shift the air pressure to high (e.g., high welding pressure) and closes a permissive input in the welding controller 25 to start the weld sequence.

The above-described continuity sensor 20 may require calibration when the safety system and/or the welding device is first installed. Calibration may be achieved with a potentiometer or other device that adjusts an amplifier gain of the amplifier 20B. Other calibration techniques involve adjusting the conditioned input sense voltage or the reference voltage fed to the comparator 22. Similarly, the above-described continuity sensor 20 may require recalibration if the calibration potentiometer is ever moved or bumped. Additionally, with the above-described continuity sensor 20, during production, if line voltage shifts instantaneously or suddenly, or if line voltage (e.g., A/C line voltage) changed throughout the day (e.g., is lower during the day and higher at night), the input sense voltage will shift proportionally, thereby changing the conditioned sense voltage fed into the comparator 22. Additionally, with the above-described continuity sensor 20, if the user changes the welding transformer tap switch to change the secondary voltage on the welder (e.g., on the welding transformer's secondary 17, e.g., gross heat control), the conditioned input sense voltage provided to the comparator 22 may also change. In these instances, the comparator 22 might not reach a negative output necessary to trigger the output relay 23 or, in a less likely scenario, might always have a negative output (e.g., which triggers a fault or lock out, as discussed above in "Sequence 2"). In either instance, the welding device will not be able to operate to complete a weld cycle. This requires a user or serviceman to manually adjust the amplifier potentiometer on our board to achieve the proper calibrated position to enable welding operation.

The digital continuity sensor 200 is an improvement over the above-described continuity sensor 20 in that the digital continuity sensor 200 provides a "centerless" voltage system. Instead of comparing the conditioned input sense voltage to a fixed reference voltage, the digital continuity sensor 200 determines a change in the measured level of the input sense voltage between when a weld cycle is initiated with the electrodes 18 open and when the electrodes 18 close and make contact with the low-resistance metal 21 being welded. By relying on the change in measured voltage levels of the input sense voltage instead of a comparison to the a fixed reference voltage, the digital continuity sensor 200 can take into account variations in the operating environment or configurations of the welding device (e.g., changing line voltages or changing welding transformer tap switch positions) without the need for recalibration. Further, the system eliminates the need for initial or repeated calibration.

In various embodiments, much like those illustrated in FIGS. 5 and 6, the digital continuity sensor 200 may include the isolation transformer 20A, for example, in embodiments where the input wires 19 are connected to the welding transformer secondary 17, as illustrated in FIG. 5. Alternatively, the isolation transformer 20A may be omitted and an integrator circuit, such as an operational amplifier integrator 201, may receive the input sense voltage from a step-down transformer 28 via wires 30, as is illustrated in FIG. 6. Alternatively still, with brief reference to FIG. 21, in another embodiment, the operational amplifier integrator 201 may receive the input sense voltage from the welding transformer secondary 17 and/or the electrodes 18. However, because the integrator circuit (e.g., the operational amplifier integrator 201) is electrically coupled to the electrodes 18 either directly or through one or more transformers or other components, the integrator circuit receives the input sense voltage at its input. The input sense voltage corresponds to the low voltage tracer signal injected across the electrodes.

Figure 22:
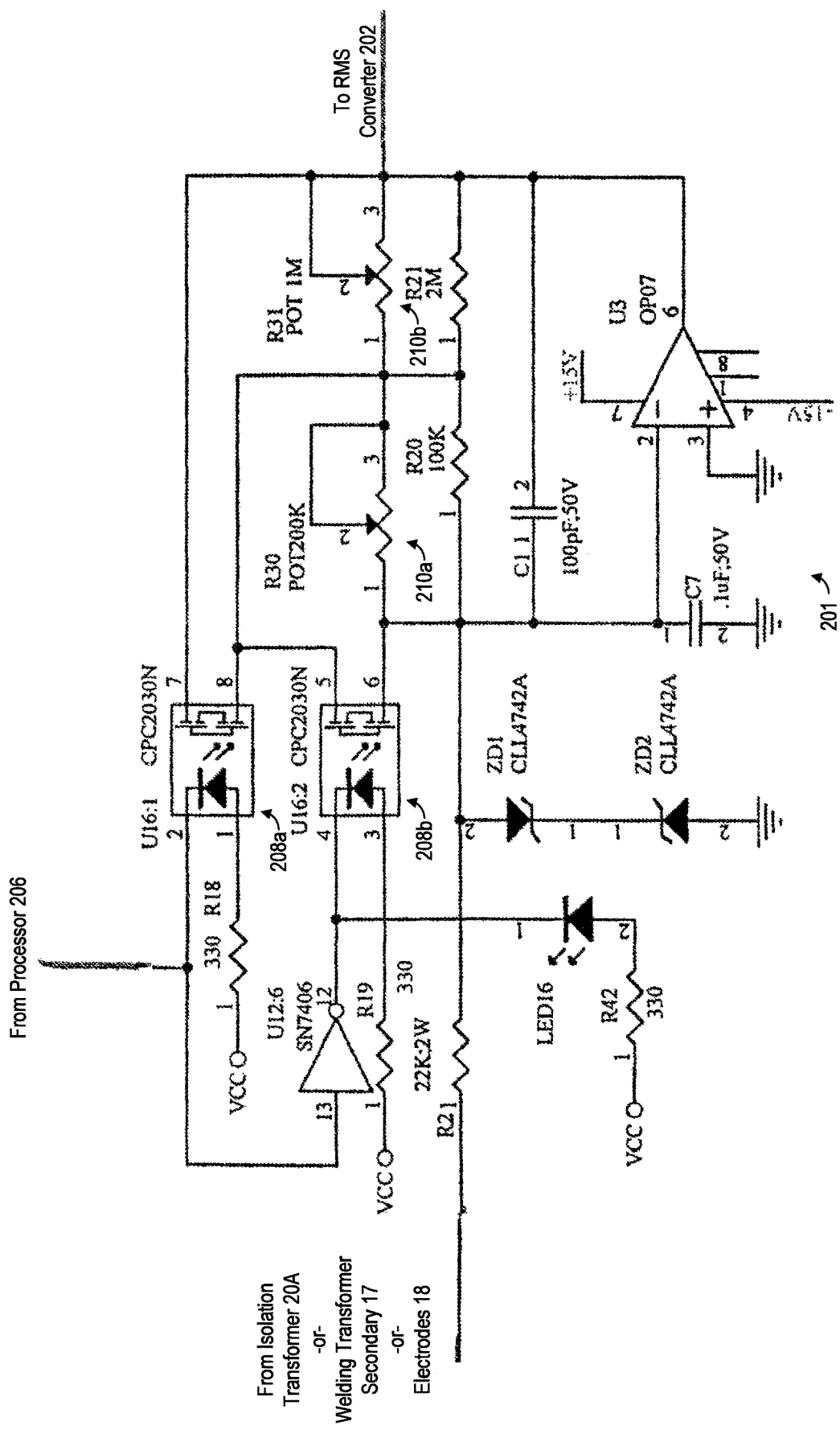
FIG. 22 is a schematic circuit diagram illustrating an example circuit in accordance with various embodiments.

The integrator circuit, which may comprise an operational amplifier integrator 201, may function similarly to operational amplifier integrator 20B or may include different or additional functionality. For example, the operational amplifier integrator 201 may also include a gain selector 210, discussed in further detail below. A schematic of an example circuit including the operational amplifier integrator 201, the isolator 208, and the gain selector 210 is illustrated in FIG. 22, discussed below. The integrator circuit (e.g., operational amplifier integrator 201) outputs an integration signal corresponding to the integral of the received input sense voltage received at the input to the integrator circuit.

The digital continuity sensor 200 may also include a root mean square (RMS) converter 202 that outputs the conditioned input sense voltage signal, much like or identical to the RMS converter 20C shown in FIGS. 5 and 6. In one embodiment, the RMS converter 202 converts the RMS power of an input into a DC voltage corresponding to the value of the RMS power of the input signal. The RMS converter 202 may provide a DC voltage output in a linear or a logarithmic scale relative to the RMS power of the signal fed into the RMS converter 202 from the operational amplifier integrator 201. The RMS converter 202 may be a standalone and/or dedicated integrated circuit, may be formed of discrete components, or may be included as part of another component, such as the processor 206. The RMS converter 202 outputs the conditioned input sense voltage signal as, in one example, a DC voltage corresponding to the power of the low voltage signal sensed on the input into the digital continuity sensor 200, which corresponds to the power of the low voltage signal as exists across the electrodes 18. In other embodiments, the processor 206 may be fed the voltage signal output from the operational amplifier integrator 201 without the RMS converter 202 and the processor 206 can perform RMS calculation (or a similar calculation) on the received input signal.

The conditioned input sense voltage signal is provided out of the RMS converter 202 to an analog-to-digital converter 204 (ADC) to digitize the conditioned input sense voltage. The ADC 204 outputs the digitized conditioned input sense voltage to a processor 206 (e.g., a microprocessor, microcontroller, or other suitable processing device). The ADC 204 outputs the digitized conditioned input sense voltage as a digital value (e.g., a binary value) corresponding to the value of the analog voltage it senses at its input. In another embodiment, the ADC 204 is included as part of the processor 206, as is illustrated by dashed line 207 in FIGS. 20 and 21. For example, the ADC 204 may be included on an input into the processor 206. In another embodiment still, the processor 206 is one in the same with a processor that may operate as the welding controller 25 or as part of circuitry for the welding controller 25.

The processor 206 receives the digitized conditioned input sense voltage and processes the digitized conditioned input sense voltage to determine continuity. Based on the determination of continuity (representing whether a low-impedance material is properly situated between the electrodes rather than a high-impedance material), the processor 206 may output an activated weld control start permissive signal to the welding controller 25 (e.g., to a permissive input of the welding controller 25) that indicates to the welding controller 25 that it is safe to apply high welding pressure and apply welding current to perform the weld. In one example, the processor 206 provides the activated weld control start permissive signal by controlling a relay 214 or a similar contact or contactless device to close (or open) it output to close (or open) the permissive input of the welding controller 25. This, in turn, enables the welding controller 25 to complete the welding process by applying the welding current to the electrodes. When not activated, the processor 206 can provide an inactivated weld control start permissive signal. For example, the processor may control the relay 214 to remain in an open position (e.g., a normally open position) thereby preventing the welder from applying welding force (being greater than the lower first force) and/or applying welding current to complete the weld cycle. Additionally, the processor 206 may output an activated high welding force signal to enable the welder to apply a high welding force to the electrodes 18. The high welding force may be greater than the first force. For example, the activated high welding force signal may control a solenoid to apply the high welding force to the electrodes through pneumatics or other mechanical devices.

In one embodiment, the integrator circuit (e.g., operational amplifier integrator 201), the RMS converter 202, and, optionally, the ADC 204 form a sensor interface circuit. As discussed above, the sensor interface circuit has inputs configured to electrically couple to the electrodes 18 of the welder and to receive an input sense voltage signal corresponding to a tracer signal injected across the electrodes 18 and to output the conditioned input sense voltage signal corresponding to the input sense voltage signal.

Figure 21:
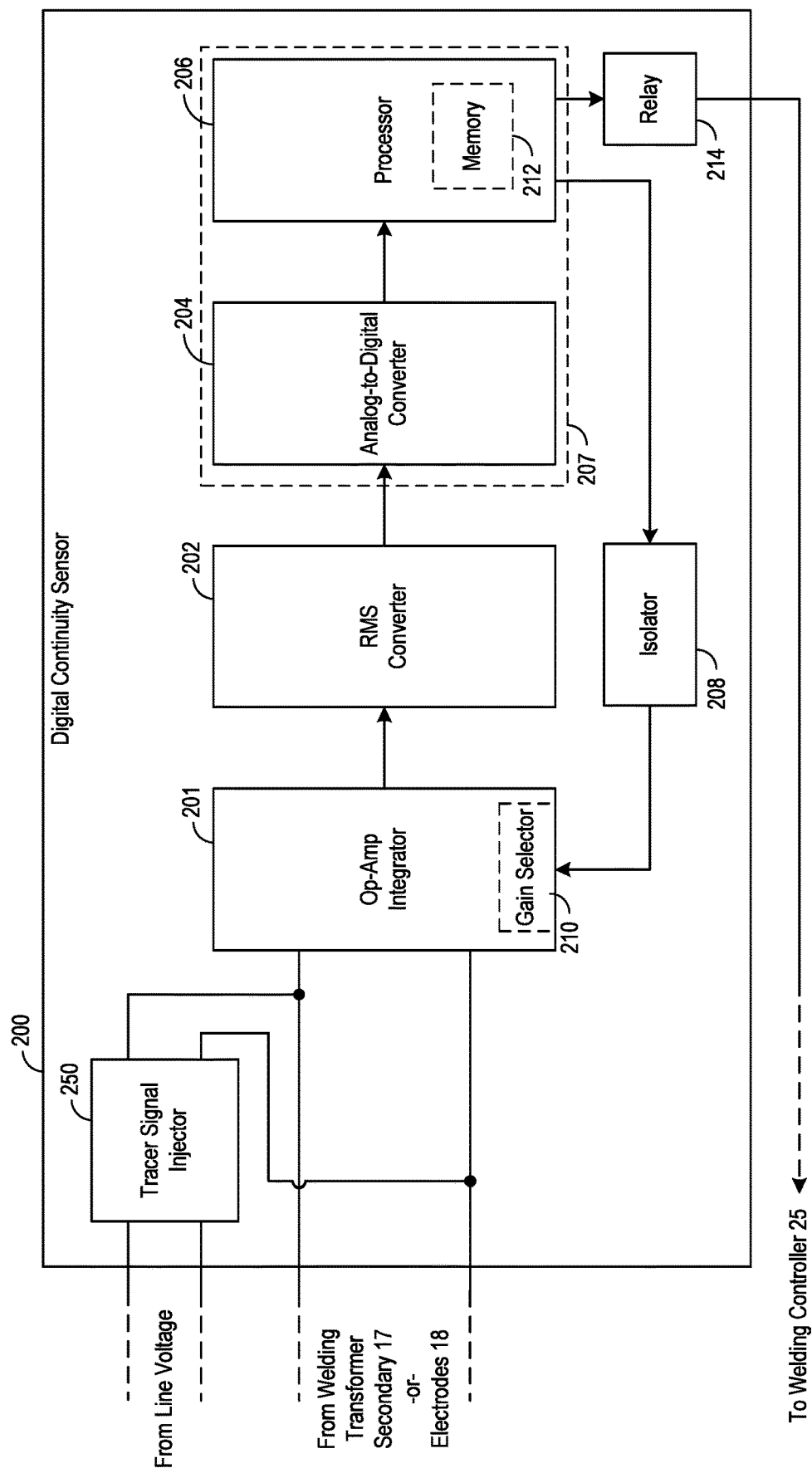
FIG. 21 is another block diagram of a digital continuity sensor in accordance with various embodiments.

Turning to FIG. 21, an alternative embodiment of the digital continuity sensor 200 is illustrated. The operational amplifier integrator 201, the RMS converter 202, the ADC 204, and the processor 206 may remain largely the same as shown in FIG. 20. However, the digital continuity sensor 200 may also include a tracer signal injector 250 including a transformer or similar device to generate the low voltage tracer signal and directly inject the low voltage tracer signal onto the welding transformer secondary 17 and/or across the electrodes 18. In one approach, the tracer signal injector 250 receives line voltage (e.g., 115 VAC) into a tracer signal injection transformer and outputs a low voltage tracer signal. An R/C element (or a similar circuit) may be placed in series with the output of the tracer signal injection transformer, between the output of the tracer signal injection transformer and the coupling point to the electrodes 18 or transformer secondary 17. The output of the tracer signal injector 250 is electrically coupled to the inputs of the digital continuity sensor 200, which are electrically coupled to the electrodes 18, for example, by being wired or otherwise connected to the welding transformer secondary 17 or directly to the electrodes 18. As discussed above, when the continuity between the electrodes 18 is low or zero, the voltage of the tracer signal will remain at a higher detectable voltage (e.g., between 0.5V and 3V or higher, though other values may be suitable in different application settings). However, when the electrodes 18 close and contact low-impedance material (e.g., sheet metal), thereby decreasing the impedance between the electrodes 18, the voltage of the tracer signal will decrease indicating proper continuity between the electrodes 18.

In one embodiment, the digital continuity sensor 200 includes a switch or set or relays to enable the digital continuity sensor 200 to operate with either the tracer signal injection arrangement discussed with reference to FIG. 21, or with the arrangement utilizing the bypass element 14, discussed above with reference to FIGS. 5 and 6. The tracer signal injection arrangement of FIG. 21 may be most beneficial when the digital continuity sensor 200 is connected to a Medium Frequency Direct Current (MFDC) welder. A MFDC welder utilizes a rectified 3-phase input voltage signal that is fed into an insulated-gate bipolar transistor (IGBT). The IGBT generates welding frequencies between 1 kHz and 20 kHz, which are fed across a welding transformer to produce a DC welding current. The use of the bypass element 14 and associated arrangement discussed above with a MFDC welder is not always compatible, while the tracer signal injection arrangement of FIG. 21 is compatible with MFDC welders.

In operation, the processor 206 of the digital continuity sensor 200 measures or samples the digital voltage level of the digitized conditioned input sense voltage provided by the ADC 204 when the processor 206 receives a weld cycle initiation signal indicating an initiation of a weld cycle (e.g., by the user initiating the weld cycle with activation of the user initiation switch such as a close foot switch or hand switch such). In one approach, the digital continuity sensor 200 is configured to receive and intercept a solenoid activation signal from the welder that would otherwise be used to activate the solenoid to apply pressure to the electrodes, which is called the weld cycle initiation signal herein. The digital continuity sensor 200 may control the application of the low first force and/or the higher welding force to the electrodes by outputting signals to control various solenoids used to control such mechanical force devices (e.g., pneumatic devices). For example, the processor 206 may be configured to output a variety of signals including an activated first force application signal that enables the welder to apply the lower first force to the electrodes. For example, the activated first welding force application signal may control a solenoid to apply the lower first force to the electrodes through pneumatics or other mechanical devices. The processor 206 may also be configured to output an activated high welding force signal that enables the welder to apply a welding force to the electrodes, which welding force is greater than the first force, and an activated weld control start permissive signal to enable the welder to apply a welding current to the electrodes.

The processor 206 may receive the weld cycle initiation signal from the initiation switch to indicate when to make the measurement and store the sample. Upon receiving the weld cycle initiation signal, the processor 206 may immediately read, measure, or sample the digital value of the digitized conditioned input sense voltage and store or otherwise memorize the sampled digital value in a register or a memory 212 as a baseline measured value. The processor 206 may store the baseline measured value in memory 212, which may exist internally or externally to the processor 206. In certain embodiments, the measurement and storage of the baseline measured value occurs at the initiation of every weld cycle (e.g., indicated by the user activating the weld cycle) and serves as a baseline measured value for that weld cycle only.

The process of measuring and storing the baseline measured value occurs every time the weld cycle is initiated by the processing device 206 receiving the weld cycle initiation signal and will not matter if the welding device has not been used for a period of time while still powered. For example, a weld cycle may have distinctly different sensor voltage input value at its initiation than the previous weld cycle (e.g., especially after a long period of time since the last weld cycle), however, the baseline measured value for the current weld cycle is resampled and stored as an updated baseline measured value for the current weld cycle upon receipt of every weld cycle initiation signal such that the previous baseline measured value, or the change in baseline measured value, does not impact the operation of the current weld cycle. In other embodiments, baseline measurement may occur less frequently, for example, after a number of weld cycles and/or after a time period, for example, every 5 cycles and/or 10 minutes.

Once the weld cycle is initiated and the baseline measured value is sampled and stored, the electrodes 18 begin to close under low force. The digital continuity sensor 200, and the processor 206 in particular, may output a signal to enable the welder to being moving the electrodes 18 together under a first force (e.g., a low force), for example, with the activated first force application signal that may control a solenoid or other mechanism. After the electrodes 18 contact the low-resistance metal 21 being welded between the tips of the electrodes 18, the input sensed voltage provided into the digital continuity sensor 200 will drop, thereby lowering the digitized conditioned input sense voltage generated by the ADC 204 and provided to the processor 206.

To sense the drop in input sense voltage across the electrodes, as the electrodes 18 continue to close under the low first force, and possible after waiting a period of time (e.g., a blanking time), the processor 206 repeatedly, continuously, and/or periodically receives and samples the current digital value(s) of the digitized conditioned input sense voltage (e.g., the instantaneous, present, or ongoing value). In one example, the processor 206 may repeatedly and periodically sample the current digital value(s) of the digitized conditioned input sense voltage every 5 ms, 10 ms, 20 ms, 50 ms, 100 ms, 200 ms, or another period suitable for a given application setting. Additionally, as the electrodes 18 continue to close under low first force, the processor 206 repeatedly, continuously, and/or periodically calculates a difference between the sampled current value of the digitized conditioned input sense voltage and the baseline measured value previously stored in memory 212. Stated another way, the processor 206 subtracts the sampled instantaneous value from the baseline measured value to calculate a difference. In one example, the processor 206 may recalculate the difference every time the processor 206 samples a new current digital value of the digitized conditioned input sense voltage.

The processor 206 will then determine whether the difference exceeds a threshold change value by comparing the calculated difference with the threshold change value. The processor 206 will repeat the above steps of sampling the current digital value, calculating the difference, and comparing the difference to the threshold change value until the processor 206 determines that the calculated difference exceeds the threshold change value or until a maximum set detect time is exceeded. In response to determining that the difference does not exceed the threshold change value, the processor 206 maintains the current inactivated state of the weld control start permissive signal to prevent the welder from applying the welding current to the electrodes 18. The processor 206 also maintains the current inactivated state of the high welding force signal to prevent the welder from applying the welding force to the electrodes 18, which welding force is higher than the first force.

If the processor 206 determines that a time since receiving the weld cycle initiation signal has exceeded the maximum set detect time, the processor 206 may initiate a timeout fault to prevent the processor 206 from outputting the activated weld control start permissive signal to prevent the welder from applying the welding force to the electrodes. In another embodiment, the processor 206 may output a signal to cause the electrodes 18 to open toward their initial starting position in response to determining that the time since receiving the weld cycle initiation signal has exceeded the maximum set detect time. For example, the processor 206 may open a relay or solenoid that controls the mechanism (e.g., pneumatic mechanism) that applies pressure to the electrodes to apply the lower first force. This then causes the electrodes to return to the initial open position.

On the other hand, once the processor 206 determines that the calculated difference exceeds a threshold change value (e.g., that the digitized conditioned input sense voltage has dropped by a value equal to the threshold change value) prior to the maximum set detect time, the processor 206 outputs the activated weld control start permissive signal to the welding controller 25 permissive input to enable the welder to complete the welding cycle. In response, the welder applies welding force to the electrodes and weld current when the weld control permissive input is closed (or solid state conducted) to complete the weld sequence. Upon completion of the weld cycle, the electrodes 18 return to the open position and the weld cycle can be reinitiated such that the above process repeats itself.

The threshold change value may be a digital value stored in firmware, for example, stored in memory 212. The threshold change value may be preset, for example, at development or manufacture time. In a different embodiment, the threshold change value may be alterable or selectable via a user interface (e.g., based on a user setting or based on a particular material(s) being welded, a thickness, a number of sheets, etc.) The threshold change value represents the minimum amount of drop in the value of the digitized conditioned input sense voltage in order for the processor 206 to determine that continuity exists between the electrodes 18 and that the weld should be completed. Viewed another way, the threshold change value also corresponds to a minimum drop of a certain number of volts (e.g., 0.5V) on the input sensed voltage received at the input to the digital continuity sensor 200 for the processor to determine that continuity exists between the electrodes 18 and that the weld should be completed. The threshold change value may correspond to a change of 0.5V or any other value as may be suitable in differing application settings.

Other features discussed elsewhere may operate in a similar fashion. For example, the feature of releasing the electrodes 18 if the calculated change does not exceed the threshold change value (indicating that low-resistance material is not present between the electrodes 18) after a maximum period of time (as discussed above in "Sequence 1a") may also occur. For example, the processor 206 may begin a timer at the initiation of the welding cycle (e.g., in response to a user initiating the welding cycle causing the electrodes 18 to begin closing under the low first force). If the timer reaches zero (or exceeds the maximum set detect time) before the processor 206 detects a change in the digitized conditioned input sense voltage exceeding the threshold change value, the processor 206 will initiate a fault and will prevent the welder from applying full welding force or completing the weld. The fault may be cleared by reinitiating the welding cycle. The processor 206 may count the number of successive faults or the number of faults within a time frame or with a total number of welding operations. If a total number of faults exceeds a fault threshold, the processor 206 may lock the welder out until further analysis or maintenance can be performed as to the reason for the multiple faults. In one approach, the value of the maximum period of time for continuity detection may be set by a user interface such as DIP switches on a control board or may be set a design time (e.g., 0.25 seconds, 0.5 seconds, 0.75 seconds, 1 second, or another appropriate time). Similarly, the other features discussed in "Sequence 1b" and "Sequence 2," discussed above, may also occur.

A variation of "Sequence 2" may occur in certain embodiments. For example, the processor 206 may detect a low-continuity condition at initiation, thus indicating a fault. However, in this variation, the resulting fault may be based on the processor 206 determining that the calculated change does not exceed the threshold change value after the electrodes 18 closed under the low first force and contacted low-resistance material.

In another variation of "Sequence 2," if the processor 206 determines that the baseline measured value measured at initiation of the weld cycle is below a hard lower limit, the processor 206 may prevent closure of the electrodes 18 under the low first force and indicate a fault and lock out condition prior to moving the electrodes 18. Similarly, if the processor 206 determines that the baseline measured value measured at initiation of the weld cycle is above a hard upper limit, the processor 206 may prevent closure of the electrodes 18 under the low first force and indicate a fault and lock out condition prior to moving the electrodes 18. In one embodiment, either of these faults may be reset by re-initiating the welding cycle with proper welding conditions. However, if the problem does not remedy itself, the processor 206 may keep the welder in lockout mode until the problem can be analyzed and remedied. Alternatively, after detecting such a condition (or after multiple fault determinations), the processor 206 may keep the welder in lockout mode until the problem can be analyzed and remedied.

In certain embodiments, the operational amplifier integrator 201 may also include a gain selector 210. To maximize the input range and resolution of the ADC 204, the gain selector 210 can be altered to change the gain of the signal output from the operational amplifier integrator 201. For example, when the digital continuity sensor 200 is first turned on, the processor 206 determines if the digitized conditioned input sense voltage is greater than or less than a percentage threshold of the maximum digital output value that can be output by the ADC 204 and/or sent to the processor 206 (e.g., 50%, 60%, 70% of the maximum, or some other percentage) prior to saturating or clipping the ADC output. For example, the processor 206 may determine whether the baseline measured value is greater than or less than the percentage threshold. If the value of the digitized conditioned input sense voltage signal is less than the percentage threshold of the maximum output value (e.g., less than 50%), then the processor 206 can output a gain switch signal to turn on an isolator 208 (e.g., a photo optic device 208) to select a higher amplification gain of the input sense voltage by the operational amplifier integrator 201. Conversely, if the value of the digitized conditioned input sense voltage is more than the percentage threshold of the maximum (e.g., more than 50%), or more than a different upper level percentage threshold (e.g., more than 90%), then the processor 206 can output the gain switch signal to turn off the isolator 208 (e.g., a photo optic device 208) to select a lower amplification gain of the input sense voltage by the operational amplifier integrator 201. By appropriately changing the gain, the digital continuity sensor 200 can operate over a very large range of input sense voltages, for example, from signals a low as 20 mV to as high as 3V or more, without losing signal resolution at the ADC 204. Additional gain ranges can be selected as may best suit a particular application setting or design requirement, for example, with the use of multiple gain selector signals or an analog gain selector signal. The processor 206 can adjust its internal measurements, comparisons, and/or threshold change value based on the selected gain. Alternatively, an analog comparator can receive the DC output of the RMS converter and compare it to a threshold value to initiate a switch between different gains. Such an analog comparator may provide its comparison output to the processor 206 so that it can account for such a gain reduction or increase in its calculations.

FIG. 22 illustrates a schematic of a circuit including an example operational amplifier integrator 201, an example isolator 208, and an example gain stage 210. As is shown, the operational amplifier integrator 201 includes an operational amplifier configured in an integration arrangement and receiving as its input the signal from the isolation transformer 20a, the welding transformer secondary 17, or the electrodes 18. The operational amplifier integrator 201 outputs the integrated signal to the RMS converter 202. As is shown, the isolator 208 includes two separate isolators 208a and 208b, which are activated the exclusion of the other dependent upon the output signal received from the processor 206. The isolators 208a and 208b, together with the potentiometers 210a and 210b and other components, form the selectable gain stage 210. The potentiometers 210a and 210b can be altered in the field to select a suitable gain range for a particular application setting. Alternatively, the potentiometers 210a and 210b may be replaced with resistors of a particular set value at design time. In this example, when the signal from the processor 206 is low, the low isolator 208a is activated such that the high resistance branch including potentiometer 210b is shunted leaving only the lower resistance branch (including potentiometer 210a) to dictate the gain of the operational amplifier inverter 201. Conversely, when the signal from the processor 206 is high, the high isolator 208b is activated such that the low resistance branch including potentiometer 210a is shunted leaving only the higher resistance branch (including potentiometer 210b) to dictate the gain of the operational amplifier inverter 201, resulting in a higher gain.

In another embodiment, the digital continuity sensor 200 may utilize a current sensor instead of the voltage sensing embodiments disclosed with reference to FIGS. 20-22. For example, the digital continuity sensor 200 may include or be attached to a current transformer to sense the current flowing through the welding transformer secondary 17. However, the logic discussed above would be reversed as current would not flow through the line until continuity exists between the electrodes 18. In such an approach, it may be beneficial to also perform an initial baseline check upon initiation of a weld sequence.

Figure 23:
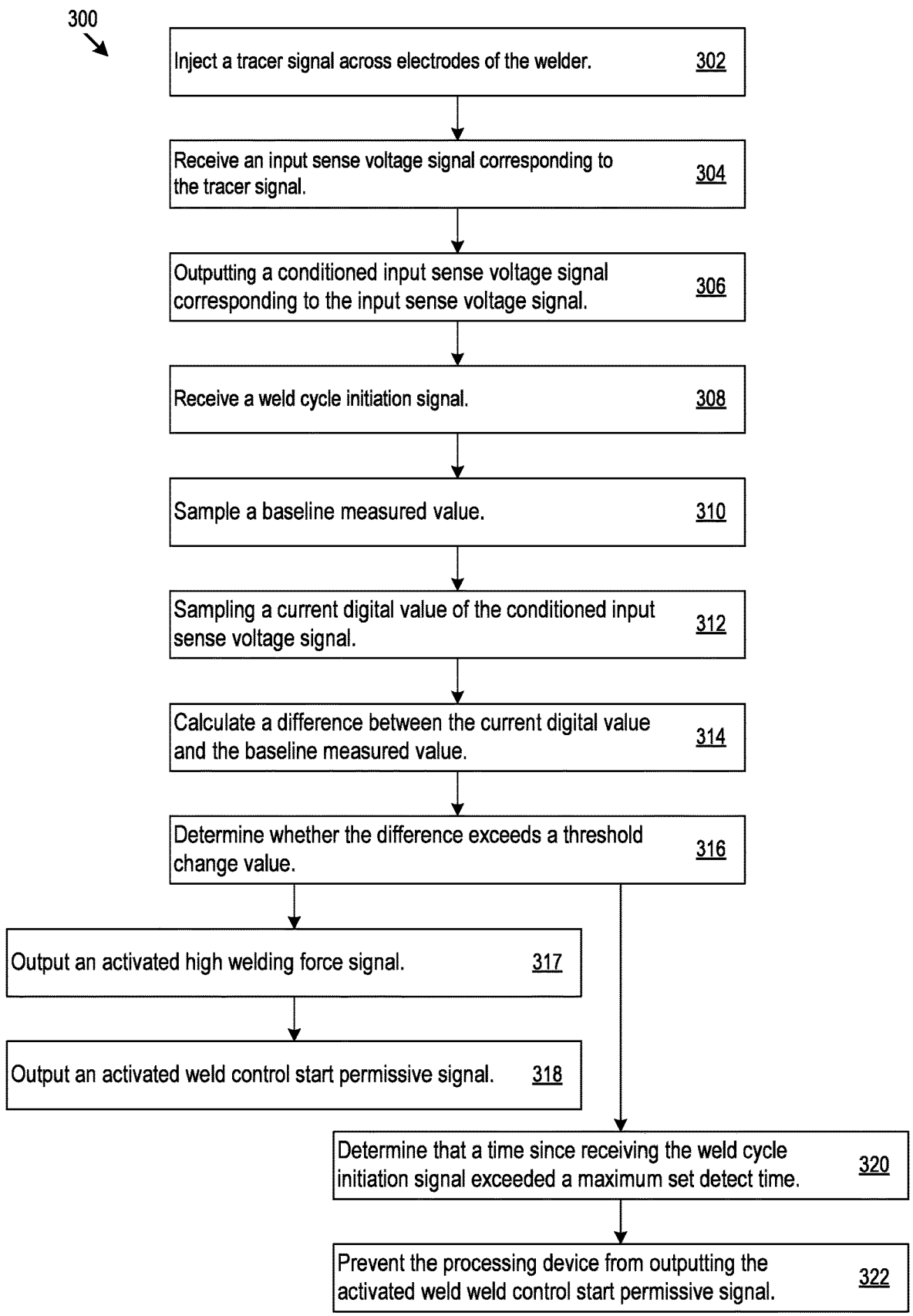
FIG. 23 illustrates an example flow diagram of logic that the digital continuity sensor may implement in accordance with various embodiments.

FIG. 23 shows an example flow diagram of logic that the digital continuity sensor 200 may implement. For example, the processor 206 and/or the other elements of the digital continuity sensor 200 may implement the various steps outlined in the flow diagram. In one approach, the logic represents a method 300 of detecting continuity between electrodes 18 of the welder. The method 300 may include a tracer signal injector 250 electrically coupled to the electrodes 18 injecting (302) a tracer signal across the electrodes 18. A sensor interface circuit electrically coupled to the electrodes may receive (304) an input sense voltage signal corresponding to the tracer signal and output (306) a conditioned input sense voltage signal corresponding to the input sense voltage signal. A processor 206 may receive the conditioned input sense voltage signal and receive (308) a weld cycle initiation signal indicating an initiation of a weld cycle. In one approach, the processor 206 initiates the welder to move the electrodes together from an initial starting position under a first force, for example, by outputting a signal to enable the welder to apply a first force to the electrodes to move the electrodes together from an initial starting position. The processor 206 may sample (310) and store a digital value of the conditioned input sense voltage signal as a baseline measured value in response to receiving the weld cycle initiation signal.

The processor 206 may sample (312) a current digital value of the conditioned input sense voltage signal after storing the baseline measured value. In one approach, the processor 206 may wait a period of time (e.g., 0.25 seconds, 0.5 seconds) after the processor 206 receives the weld cycle initiation signal, or after the processor 206 samples (310) and stores the baseline measured value before beginning to sample (312) the current digital value of the conditioned input sense voltage signal. This period of time (e.g., "blanking time") prevents false detection of continuity caused by artificially lowered power signals influenced by the operation of solenoids (e.g., to begin closing the electrodes under the lower first force) or operation of other elements of the welder.

After sampling (312) the current digital value of the conditioned input sense voltage signal, the processor 206 can then calculate (314) a difference between the current digital value of the conditioned input sense voltage and the baseline measured value and determine (316) whether the difference exceeds a threshold change value. If the processor 206 determines that the difference exceeds the threshold change value, the processor 206 may output (317) an activated high welding force signal to enable the welder to apply a welding force to the electrodes, the welding force being greater than the first force. Additionally, if the processor 206 determines that the difference exceeds the threshold change value, the processor 206 may output (318) an activated weld control start permissive signal, the activated weld control start permissive signal to enable the welder to apply welding current to complete the weld. However, if the processor determines that the difference does not exceed the threshold change value, the processor 206 may determine (320) that a time since receiving the weld cycle initiation signal has exceeded a maximum set detect time and initiate (322) a timeout fault to prevent the processing device from outputting the activated weld cycle completion signal to prevent the welder from applying the welding force to the electrodes.

In other embodiments, if the processor 206 determines that the difference does not exceed the threshold change value, the processor 206 may repeat the steps of sampling (312) the current digital value of the conditioned input sense voltage, calculating (314) the difference, and determining (316) whether the difference exceeds the threshold change value.

In yet other embodiments, the method may include, at an integrator circuit of the sensor interface circuit, receiving the input sense voltage signal corresponding to the tracer signal across the electrodes, performing an integration on the input sense voltage signal, and outputting an integration signal. The method may also include, at a root mean square (RMS) converter of the sensor interface circuit, receiving the integration signal and converting the received integration signal to output the conditioned input sense voltage signal indicative of a power level of the input sense voltage signal. Further, the ADC may receive and convert the conditioned input sense voltage signal into the digital value of the conditioned input sense voltage signal. Further still, the method may include the processing device determining that the baseline measured value does not exceed a percentage threshold of a digital output limit of the ADC and outputting a gain switch signal to a gain selector of the integrator circuit to select an increased amplifier gain setting for the integrator circuit. The gain selector may switch to an increased amplifier gain setting for the integrator circuit in response to the processing device outputting the gain switch signal.

So configured, and in accordance with various embodiments, the digital continuity sensor 200 works "out of the box" without the need for field adjustments or recalibrations. Further, the digital continuity sensor 200 works during production without the need for recalibration.

Mechanical Methods for Attaining Low Approach Force.

Methods of mechanical operation to provide both low and high force between the electrodes are provided. Different mechanical arrangements of pneumatic and other components can be used to operate different types of resistance welding machines. This section covers the most common welding systems. However the present disclosure is not limited to this machinery group.

Welders with Significant Ram Weight:

Force between electrodes produced by gravity closure (weight of the ram) alone on this type of welder is high enough to cause significant pinch point injury. FIG. 1 illustrates a press welder that typically utilizes a guided ram containing an electrode holder, and is activated by a cylinder. The cylinder can be operated directly or indirectly, by air, hydraulics, or a hybrid of the two.

In various approaches, a system is installed to partially counterbalance the gravity dead weight of the ram during the initial stages of each cycle and until continuity between the electrodes has been established.

Figure 9:
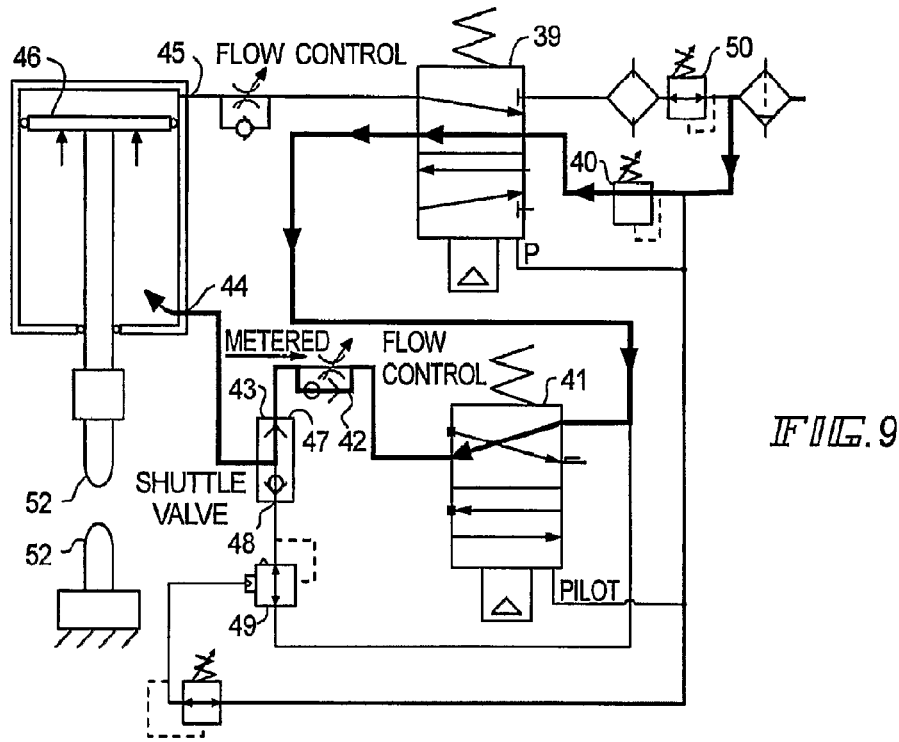
FIG. 9 is a pneumatic drawing showing a method for preventing high force between the electrodes on welders with substantial ram weight, showing the welder at rest, in accordance with various embodiments.

In various approaches, a pneumatically operated cylinder to operate a press welder is shown in FIG. 9. In this figure, the welder is at rest with the electrodes fully opened. Line pressure air from 5-way solenoid valve 39 is reduced by regulator 40 and passes through 3-way solenoid valve 41 through flow control valve 42, to shuttle valve 43. Because at this time there is no air pressure on the other input port of this shuttle valve, this air passes through the shuttle valve 43 and then to the bottom of the air cylinder at port 44. Since there is no air pressure on the top cylinder port 45 air pressure on the underside of the welder cylinder piston 46 keeps the welder cylinder in the retracted position to keep the electrodes fully apart.

Figure 10:
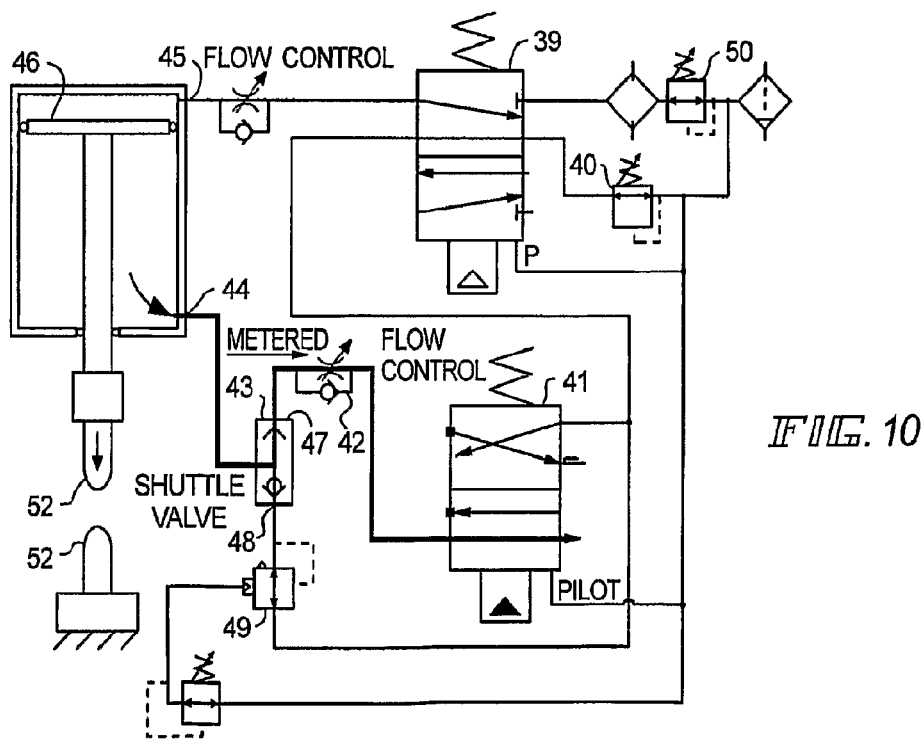
FIG. 10 is a pneumatic drawing like that of FIG. 9, but with the first stage of the ram dropping by gravity, in accordance with various embodiments.

The sequence of events during a typical welding cycle is shown in FIG. 10. When the welding control is first initiated (closing of foot or other switch), three way solenoid valve 41 is energized to exhaust air from the bottom of the welder cylinder at port 44 through the shuttle valve 43 and to flow control valve 42. The airflow is metered by this flow control valve and moves through 3-way solenoid valve 41 to this valve's exhaust.

Lowering of air pressure on the underside of piston 46 causes the cylinder piston to drop under the force of gravity. As this happens, downward movement of the welder cylinder piston 46 pushes air out of lower port 44. Because this airflow is restricted by flow control valve 42 air in the lower portion of this cylinder is partially compressed to impose a backpressure on the underside of piston 46. This back pressure imposes an upward force on piston 46 to partially reduce the gravity-produced weight of the welder's ram.

Figure 11:
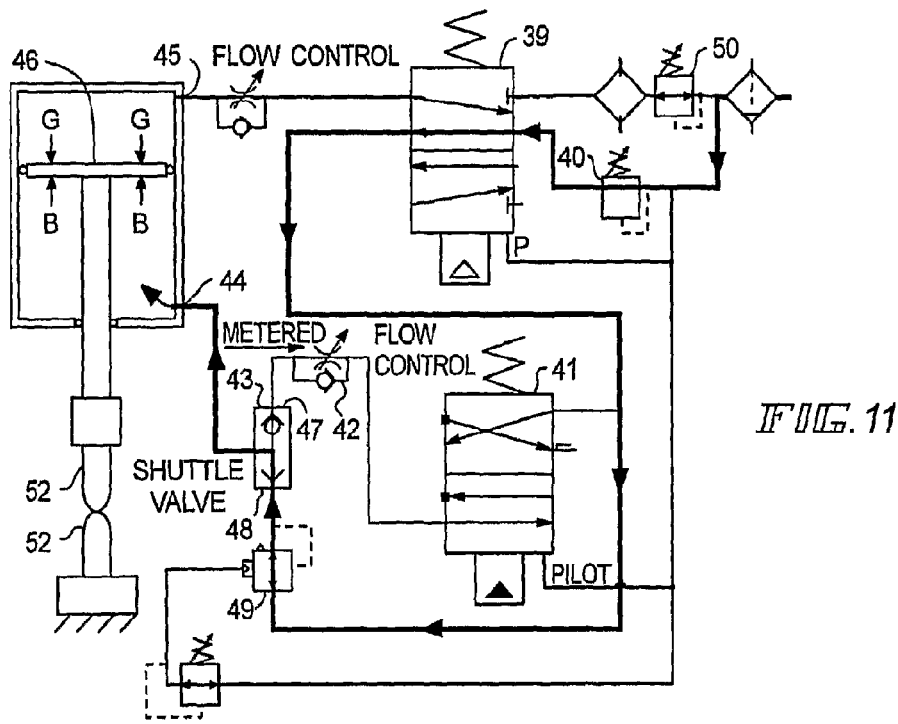
FIG. 11 is a pneumatic drawing like that of FIG. 9, with bucking pressure being applied to balance some of the ram's weight, in accordance with various embodiments.

As shown in FIG. 11, when air pressure at the solenoid valve side 47 of shuttle valve 43 drops to a pressure lower than that at regulator side 48 of this shuttle valve, the shuttle valve shifts to block additional exhaust through solenoid valve 41 and imposes air pressure of regulator 49.

This air pressure on the underside of piston 46 continues to impose an upward force on this piston to partially balance the gravity-produced weight of the welder's ram. At this stage of the sequence, force in pounds between the welding electrodes 50 is represented by the formula: $F=RW-(psi \times A)$ Where:
F=force between electrodes in pounds
RW=gravity weight of welder ram in pounds
psi=air pressure of regulator 49 in psi
A=underside area of welder cylinder piston 46 in$^2$ Force can also be calculated using the appropriate formula for metric measurements.

Figure 12:
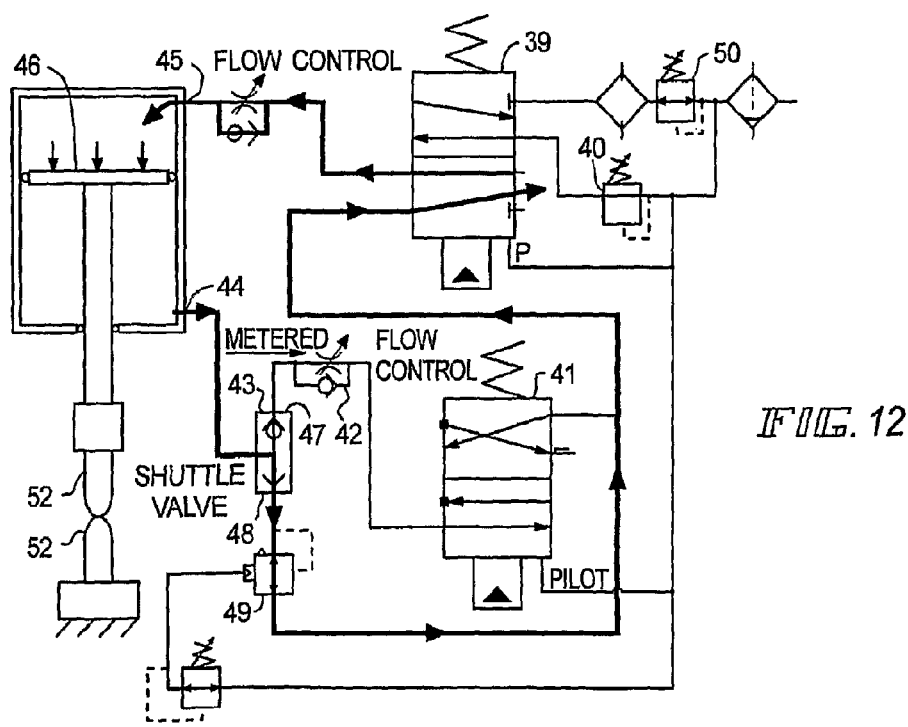
FIG. 12 is a pneumatic drawing like that of FIG. 9 with full welding force being applied if the sensor(s) has been satisfied, in accordance with various embodiments.

FIG. 12 shows the sequence that follows if the input contact is closed from the continuity sensor (or both continuity sensor and limit switch if so installed) to the welding control within the maximum customer-set sensor time.

At this time, the control energizes solenoid valve 39 while still keeping solenoid valve 41 energized. This puts higher-pressure air, as supplied from regulator 50, on the top of the welder cylinder at port 45, and exhausts air from the bottom of the welder cylinder 44 through shuttle 43, through pressure regulator 49, and out the exhaust of solenoid 39.

When the sequence has been completed, the air on the top of the welding cylinder piston 46 will be at the level of pressure regulator 50, and the air on the bottom of the welding cylinder piston will be zero. The welding electrodes will now be at full force for welding.

At this stage of the sequence, force in pounds between the welding electrodes 50 is represented by the formula: $F=psi \times A$ Where:
F=force between electrodes in pounds
psi=air pressure of regulator 50, in psi
A=top area of welder cylinder piston 46 in$^2$ After the weld sequence has been completed, the welding control will deenergize both solenoid valves 39, and 41 to return the welder cylinder piston 46 to the retraced position of FIG. 9. If the input is not closed from the continuity sensor (or both continuity sensor and limit switch if so installed) to the welding control within the maximum customer-set sensor time, solenoid valve 39 will not be energized, and solenoid valve 41 will be de-energized to return the welder cylinder piston 46 to the retraced position of FIG. 9.

Welders without Significant Ram Weight, and Will not Close Under Gravity:

These welder types require a different pneumatic scheme for operation.

Figure 2:
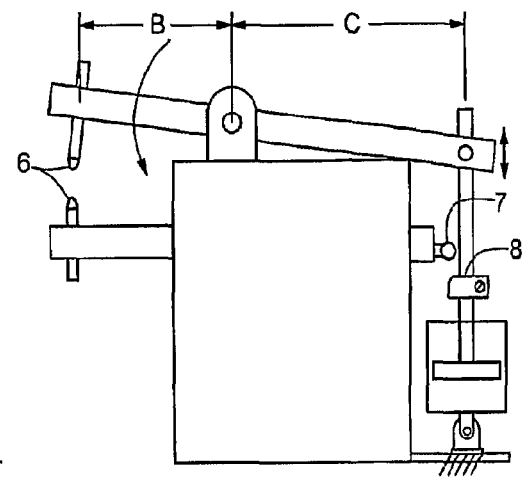
Figure 3:
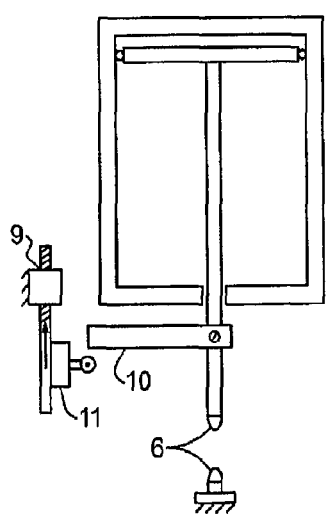
Figure 4:
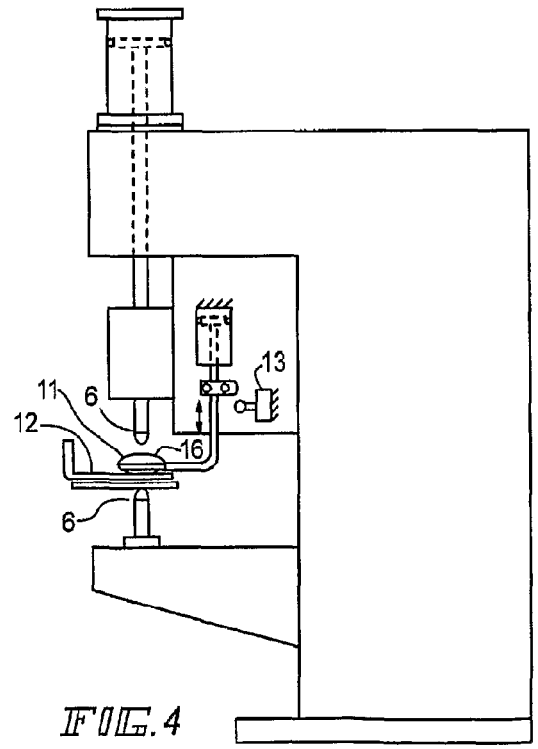

Rocker Arm:

The typical mechanical design of one type, a rocker arm welder, is shown in FIG. 2. This type of welder typically utilizes a pivoted beam arrangement with an air cylinder on one end of the beam to close the electrodes in the opposite direction on the other end of the beam.

Unless the beam is very long and made of very heavy material, force between electrodes on this type of rocker arm welder is normally zero or very low when air is exhausted from the welding cylinder. In most cases, the electrodes will not even close when air is removed from the cylinder.

Low Ram Weight Press Welders:

A second type, as shown in FIG. 1, is a press welder that contains a ram that does not have significant weight to overcome friction in the welder cylinder and will not close the electrodes by gravity when air is removed from the welder cylinder.

Figures 13, 14:
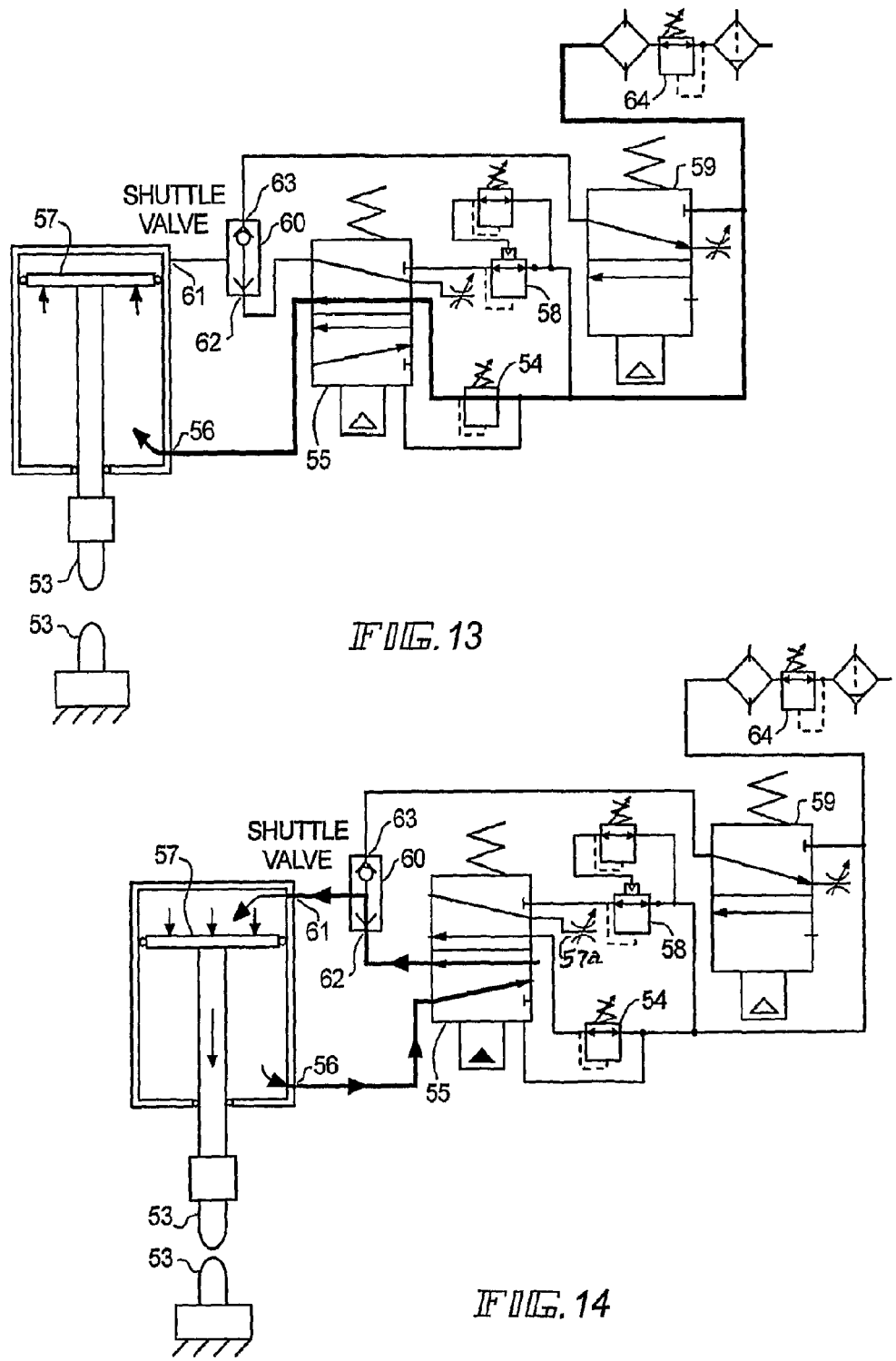
FIG. 13 is a pneumatic drawing of a welder that is at rest and has a ram without substantial dead weight which will not close under gravity and which typically has a rocker arm welder or a welder using a fixture type package cylinder, in accordance with various embodiments.
FIG. 14 is a pneumatic drawing similar to FIG. 13 with low force being applied for travel of the electrode prior to the sensor(s) being satisfied, in accordance with various embodiments.

An example arrangement for operating the welding cylinder of these two welder types is shown in FIG. 13. In this figure, the welder is at rest, with the electrodes 52 fully open.

In various approaches, regulated air from regulator 54 goes through 5-way solenoid valve 55 and to port 56 of the welder cylinder. This imposes air pressure on the underside of the welder cylinder piston, 57 to keep the welder cylinder piston in the retracted position and the electrodes, 53 open. On a rocker arm welder, this air cylinder is typically installed inverted from the illustration as shown in FIG. 2, but the action within the welder cylinder is identical.

The sequence of events during a typical welding cycle starts as shown in FIG. 14. When the welding control is first initiated (closing of foot or other switch), five-way solenoid valve 55 is energized to exhaust air from the bottom of the welder cylinder 56 out the exhaust port of solenoid valve 55 using flow control valve 57 to meter the airflow and control the closing speed. At the same time, low-pressure air is supplied from pressure regulator 58 through 5-way solenoid valve 55 to port 62 on shuttle valve 60. Because at this time there is no pressure coming into port 63 of the shuttle valve, this low-pressure regulated air passes through to port 61 on the welder cylinder. This moves the welder piston 57 forward under low force until electrodes 53 touch. Force, in pounds, between the electrodes at this stage of the sequence for a press welder is represented by the formula: $F=psi \times A$ Where:
F=force between electrodes in pounds
psi=air pressure of regulator 58, in psi
A=top area of welder cylinder piston 57 in$^2$
Force, in pounds, between the electrodes at this stage of the sequence for a rocker arm welder, is represented by the formula $F=C/B \times (psi \times A)$ Where:
F=force between electrodes in pounds
psi=air pressure of regulator 58, in psi
A=top area of welder cylinder piston 57 in$^2$
B and C=dimensions from FIG. 2
Force can also be calculated for either press or rocker arm systems using the appropriate formula for metric measurements.

Figure 15:
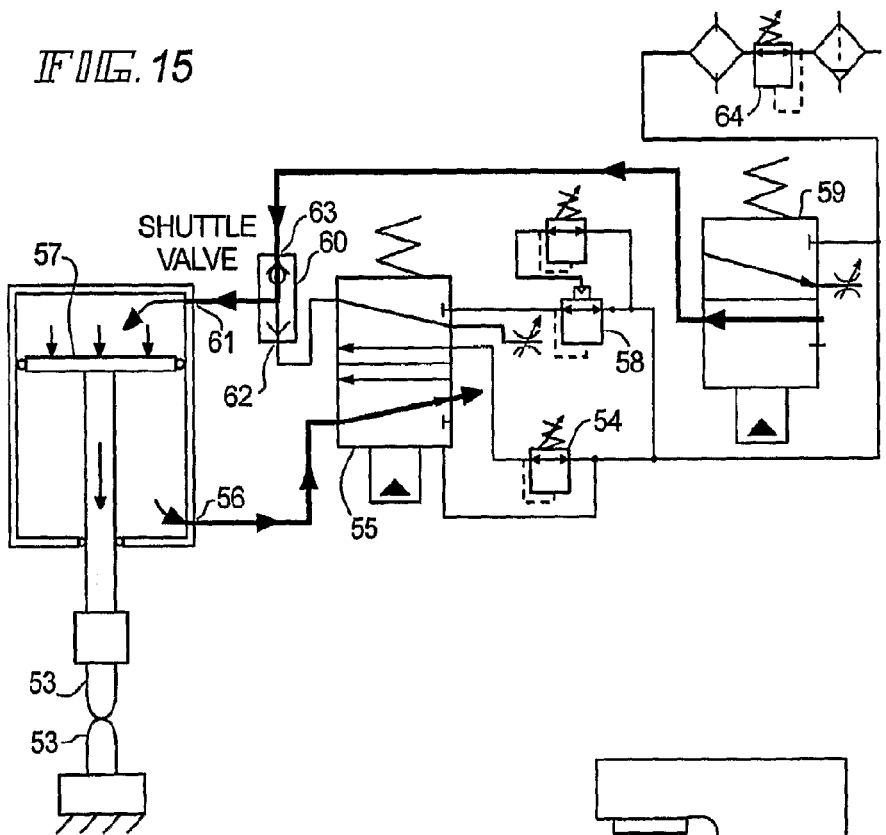
FIG. 15 is pneumatic drawing similar to FIG. 13 with full force being applied if the sensor(s) has been satisfied, in accordance with various embodiments.

FIG. 15 shows the sequence that follows if the input contact is closed from the continuity sensor (or both continuity sensor and limit switch if so installed) to the welding control within the maximum customer-set sensor time. At this time, the control energizes solenoid valve 59 while still keeping solenoid valve 55 energized. This puts higher-pressure air, as supplied from regulator 64, into port 63 of shuttle valve 60 to shift the shuttle valve and pu higher pressure air on the top of the welder cylinder at port 61.

Force, in pounds, between the electrodes at this stage of the sequence for a press welder is represented by the formula F=psi×A Where:
F=force between electrodes in pounds
psi=air pressure of regulator 64, in psi
A=top area of welder cylinder piston, 57, in²

Force, in pounds, between the electrodes at this stage of the sequence for a rocker arm welder, is represented by the formula F=C/B X (psi×A)

Where:
F=force between electrodes in pounds
psi=air pressure of regulator 64, in psi
A=area of welder cylinder piston 57 in²
B and C=dimensions from FIG. 2

Force can also be calculated using the appropriate formula for metric measurements or for welder cylinders that use air-over-oil intensifier systems.

After the weld sequence has been completed, the welding control will deenergize both solenoid valves 55, and 59 to return the welder cylinder piston 57 to the retraced position of FIG. 13.

If the input is not closed from the continuity sensor (or both continuity sensor and limit switch if so installed) to the welding control within the maximum customer-set sensor time, solenoid valve 59 will not be energized, and solenoid valve 55 will be de-energized to return the welder cylinder piston 57 to the retraced position of FIG. 13.

Figure 16:
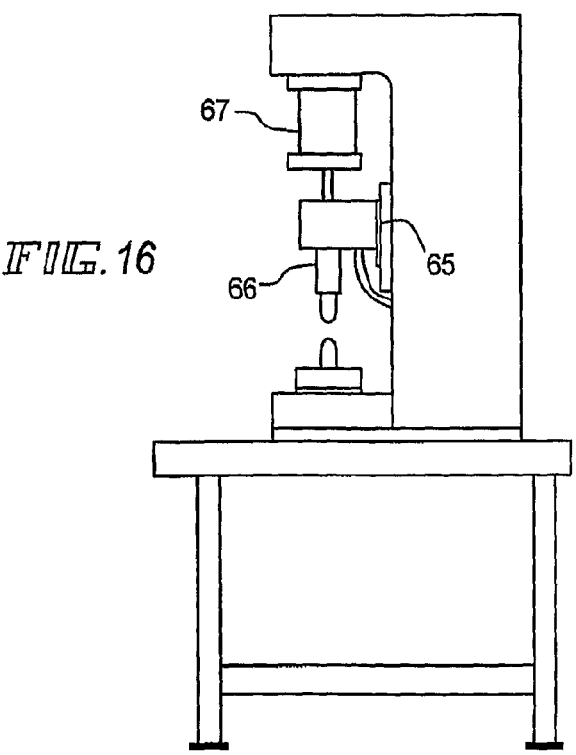
FIG. 16 illustrates an example mechanical arrangement of a welder having a ram without substantial dead weight but that will close under gravity when air is removed from the cylinder, in accordance with various embodiments.

Welders without Significant Weight but that Close Under Gravity:

This type of welder can use a much more simple arrangement to utilize the features of the present disclosure. The mechanical arrangement for a press welder, as shown in FIG. 16, has enough ram weight to allow it to close under gravity but is light enough to prevent pinch point damage under gravity closing is. This type of welder typically utilizes a guided ram 65 that contains an electrode holder 66 and is activated by a cylinder 67. The cylinder can be operated directly or indirectly, by air, hydraulics, or a hybrid of the two.

Figure 17:
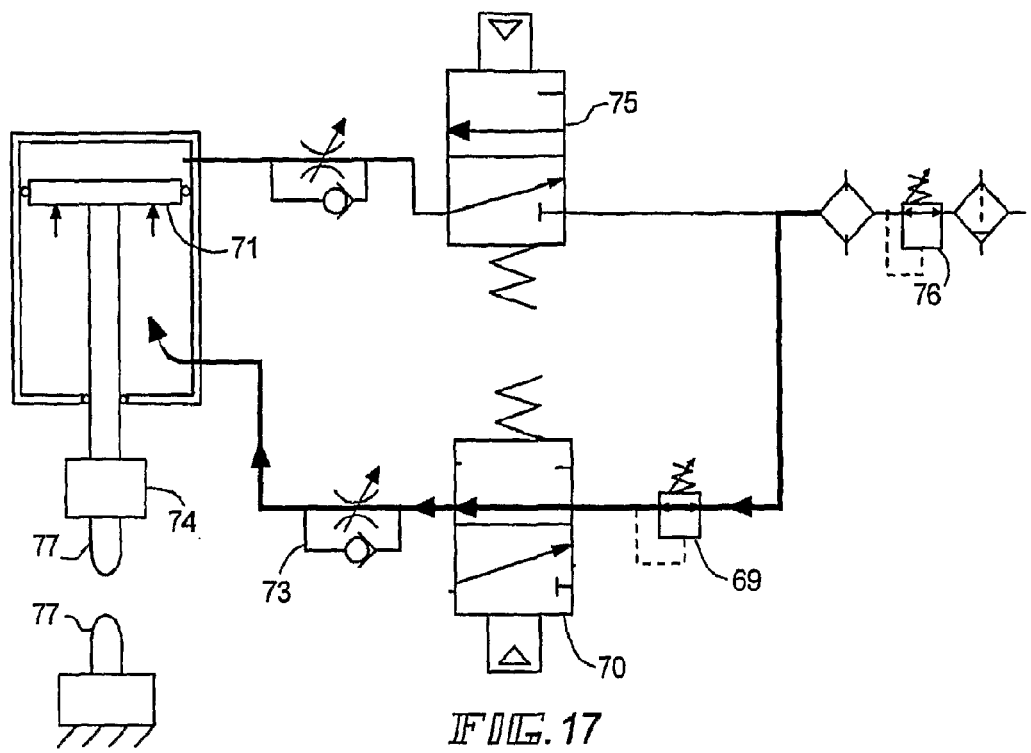
FIG. 17 is a pneumatic drawing for a system shown at rest to prevent high force applied between the electrodes, similar to that shown in FIG. 16, in accordance with various embodiments.

A pneumatically operated cylinder is shown in FIG. 17 in accordance with various embodiments. In this figure, the welder is at rest with the electrodes fully opened. Line pressure air is reduced by regulator 69 and passes through 3-way solenoid valve 70 to impose air pressure on the underside of the welder cylinder piston, 71. This keeps the welder cylinder open.

Figure 18:
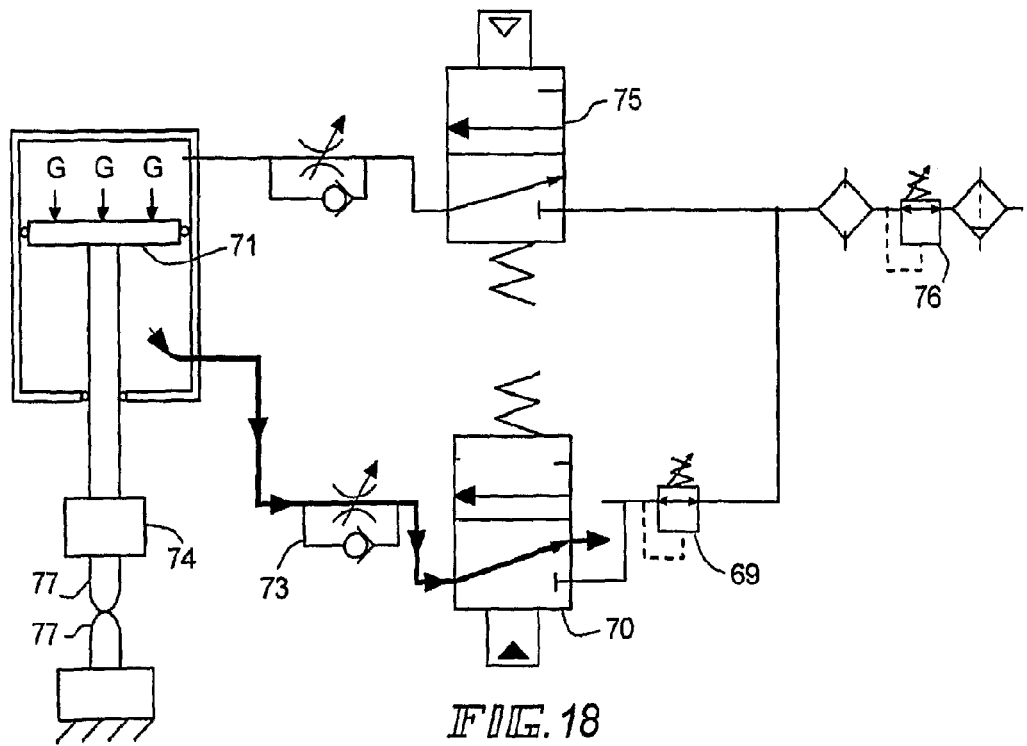
FIG. 18 is a pneumatic drawing of the system shown in FIG. 17 with the ram falling by gravity (weight of weld ram), in accordance with various embodiments.

The sequence of events during a typical welding cycle starts as shown in FIG. 18. When the welding control is first initiated (closing of foot or other switch), three-way solenoid valve 70 is energized to exhaust air from the bottom of the welder cylinder using flow control valve 73 to meter the airflow and control the closing speed until the electrodes touch.

Force, in pounds, between the electrodes 77 at this stage of the sequence is the dead gravity weight of the welder's ram 74.

Figure 19:
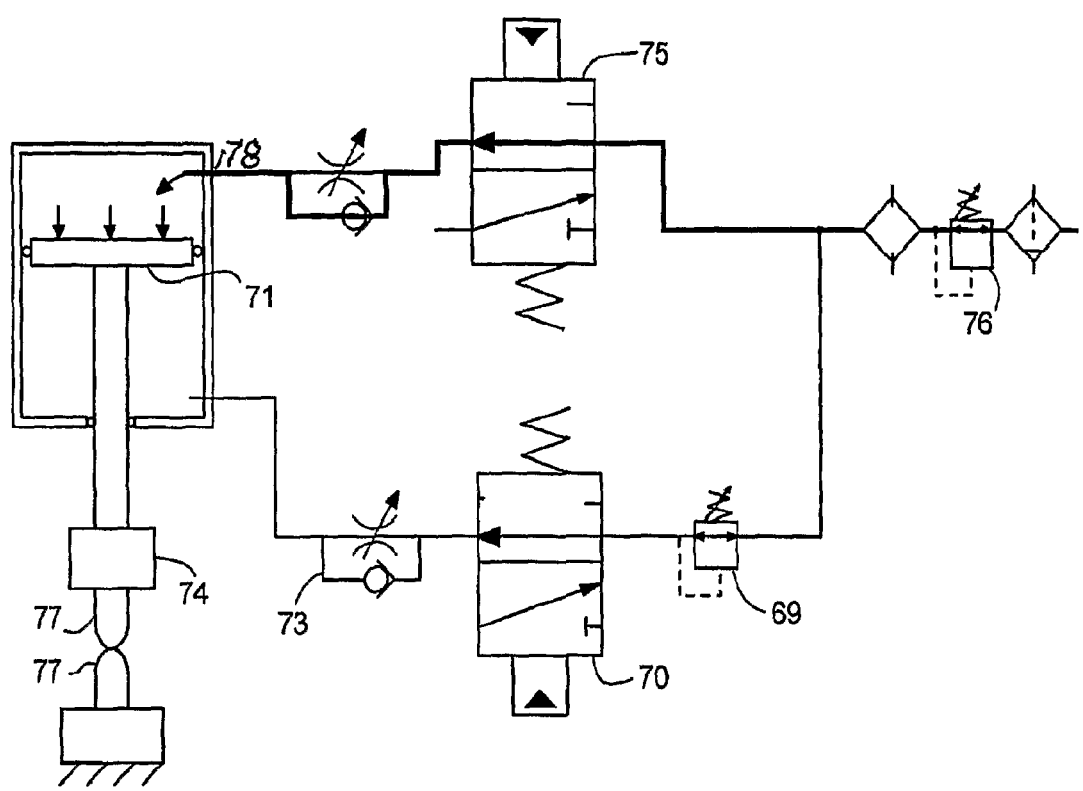
FIG. 19 is a pneumatic drawing of the system shown in FIG. 17 illustrating application of full welding force if the sensor(s) has been satisfied, in accordance with various embodiments.

FIG. 19 shows the sequence that follows if the input contact is closed from the continuity sensor (or both continuity sensor and limit switch if so installed) to the welding control within the maximum customer-set sensor time. At this time, the control energizes three-way solenoid valve 75 while still keeping solenoid valve 70 energized. This puts air, as supplied from regulator 76, on the top of the welder cylinder at port 77. Force, in pounds, between the electrodes at this stage of is represented by the formula: F=psi×A Where:
F=force between electrodes in pounds
psi=air pressure of regulator 76, in psi
A=top area of welder cylinder piston in²

Force can also be calculated using the appropriate formula for metric measurements or for welder cylinders that use air-over-oil intensifier systems.

Welders that Use Servo Motors or Other Motor Driven Systems:

This type of welder utilizes a motor-driven mechanism to close the electrodes. The system communicates with the servo control circuitry to provide low torque prior to electrode continuity detection. If continuity is not detected prior to the maximum detection time has expired, the low-force signal to the servo control circuitry will be turned off to force the servo system to return the electrode to the fully open position.

While embodiments have been shown in considerable detail, it is not intended that the disclosure should be limited to the exact construction described and many changes and modifications of the structure and methods can be made without departing from the spirit or scope of the disclosure.

What is claimed is:

1. A safety sensor for a welder comprising:
   a sensor interface circuit having inputs configured to electrically couple to electrodes of a welder and to receive an input sense voltage signal corresponding to a tracer signal injected across the electrodes and to output a conditioned input sense voltage signal corresponding to the input sense voltage signal;
   a processing device electrically coupled to the sensor interface circuit and at least one of comprising or electrically coupled to at least one memory, the processing device configured to:
   receive, from the sensor interface circuit, the conditioned input sense voltage signal;
   receive a weld cycle initiation signal indicating an initiation of a weld cycle, wherein initiation of the weld cycle comprises movement of the electrodes together from an initial starting position of the welder under a first force;
   at a first time, sample a digital value of the conditioned input sense voltage signal as a digital baseline measured value in response to receiving the weld cycle initiation signal;
   store the digital value of the conditioned input sense voltage signal as the digital baseline measured value in the at least one memory;
   at a second time after the first time, sample a current digital value of the conditioned input sense voltage;
   calculate a digital difference between the current digital value of the conditioned input sense voltage signal and the digital baseline measured value;
   determine whether the digital difference exceeds a digital threshold change value thereby indicating continuity between the electrodes; and
   output an activated weld control start permissive signal in response to determining that the digital difference exceeds the digital threshold change value, the activated weld control start permissive signal to enable the welder to apply a welding current to the electrodes to complete the weld.

2. The safety sensor of claim 1 wherein the processing device is further configured to:
   output an activated high welding force signal to enable the welder to apply a welding force to the electrodes, the welding force being greater than the first force.

3. The safety sensor of claim 1 wherein the processing device is further configured to:
wait a period of time after sampling the digital value of the conditioned input sense voltage signal as the digital baseline measured value; and
sample the current digital value of the conditioned input sense voltage signal after waiting the period of time.

4. The safety sensor of claim 1 wherein the processing device is further configured to:
in response to determining that the difference does not exceed the digital threshold change value, repeat a process of sampling the current digital value of the conditioned input sense voltage, calculating the digital difference, and determining whether the digital difference exceeds the digital threshold change value.

5. The safety sensor of claim 4 wherein the processing device is further configured to:
in response to determining that the digital difference does not exceed the digital threshold change value, determine that a time since receiving the weld cycle initiation signal has exceeded a maximum set detect time; and
initiate a timeout fault to prevent the processing device from outputting the activated weld control start permissive signal to prevent the welder from applying the welding current to the electrodes.

6. The safety sensor of claim 5 wherein the processing device is configured to output a signal to cause the electrodes to open toward their initial starting position in response to determining that a time since receiving the weld cycle initiation signal has exceeded a maximum set detect time.

7. The safety sensor of claim 1 wherein the processing device is further configured to:
in response to determining that the digital difference does not exceed the digital threshold change value, maintain a current inactivated state of the weld control start permissive signal to prevent the welder from applying the welding current to the electrodes.

8. The safety sensor of claim 1 further comprising:
a tracer signal injector configured to electrically couple to the electrodes of the welder and configured to inject the tracer signal across the electrodes.

9. The safety sensor of claim 8 wherein the tracer signal injector comprises a tracer signal injection transformer configured to receive alternating current line voltage and to output the tracer signal.

10. The safety sensor of claim 1 wherein the sensor interface circuit further comprises:
an integrator circuit configured to:
electrically couple to the electrodes of the welder;
receive the input sense voltage signal corresponding to the tracer signal across the electrodes;
perform an integration on the input sense voltage signal; and
output an integration signal; and
a root mean square (RMS) converter configured to:
receive the integration signal; and
convert the received integration signal to output the conditioned input sense voltage signal indicative of a power level of the input sense voltage signal.

11. The safety sensor of claim 10 further comprising:
an analog-to-digital converter (ADC) to receive and convert the conditioned input sense voltage signal into the digital value of the conditioned input sense voltage signal, wherein the processing device at least one of comprises or is electrically coupled to the ADC.

12. The safety sensor of claim 11 wherein the integrator circuit further comprises a gain selector:
wherein the processing device is further configured to:
determine that a digital value of the conditioned input sense voltage signal does not exceed a percentage threshold of a digital output limit of the ADC; and
output a gain switch signal to the gain selector of the integrator circuit to select an increased amplifier gain setting for the integrator circuit;
and
wherein the gain selector is configured to responsively switch to an increased amplifier gain setting for the integrator circuit.

13. The safety sensor of claim 1 wherein the processing device is further configured to:
resample and store the digital value of the conditioned input sense voltage signal as an updated digital baseline measured value every time the processing device receives a weld cycle initiation signal.

14. A method of detecting continuity between electrodes of a welder, the method comprising:
injecting a tracer signal across electrodes of a welder by a tracer signal injector electrically coupled to the electrodes;
receiving, at a sensor interface circuit electrically coupled to the electrodes, an input sense voltage signal corresponding to the tracer signal and outputting a conditioned input sense voltage signal corresponding to the input sense voltage signal;
receiving, by a processing device, the conditioned input sense voltage signal;
receiving, by the processing device, a weld cycle initiation signal indicating an initiation of a weld cycle, the weld cycle comprising the welder moving the electrodes together from an initial starting position under a first force;
sampling, by the processing device, a digital value of the conditioned input sense voltage signal as a digital baseline measured value in response to receiving the weld cycle initiation signal;
storing the digital value of the conditioned input sense voltage signal as the digital baseline measured value in at least one memory, wherein the processing device at least one of comprises or is electrically coupled to the at least one memory;
waiting a period of time after sampling the digital value of the conditioned input sense voltage signal as the baseline measured value;
sampling, by the processing device, a current digital value of the conditioned input sense voltage signal after waiting the period of time;
calculating, by the processing device, a digital difference between the current digital value of the conditioned input sense voltage and the digital baseline measured value;
determining, by the processing device, whether the digital difference exceeds a digital threshold change value;
outputting, by the processing device, an activated weld control start permissive signal in response to determining that the digital difference exceeds the digital threshold change value, the activated weld control start permissive signal to enable the welder to apply a welding current to the electrodes; and
outputting an activated high welding force signal to enable the welder to apply a welding force to the electrodes, the welding force being greater than the first force.

15. The method of claim 14 further comprising:
in response to determining that the digital difference does not exceed the threshold change value, repeating the steps of sampling the current digital value of the conditioned input sense voltage, calculating the digital difference, and determining whether the digital difference exceeds the digital threshold change value.

16. The method of claim 15 further comprising:
in response to determining that the digital difference does not exceed the threshold change value, determining, by the processing device, that a time since receiving the weld cycle initiation signal has exceeded a maximum set detect time;
initiating, by the processing device, a timeout fault to prevent the processing device from outputting the activated weld control start permissive signal to prevent the welder from applying the welding current to the electrodes; and
outputting a signal to cause the electrodes to open toward their initial starting position in response to determining that a time since receiving the weld cycle initiation signal has exceeded the maximum set detect time.

17. The method of claim 14 further comprising:
at an integrator circuit of the sensor interface circuit:
receiving the input sense voltage signal corresponding to the tracer signal across the electrodes;
performing an integration on the input sense voltage signal; and
outputting an integration signal;
at a root mean square (RMS) converter of the sensor interface circuit:
receiving the integration signal; and
converting the received integration signal to output the conditioned input sense voltage signal indicative of a power level of the input sense voltage signal;
and
receiving and converting, at an analog-to-digital converter (ADC), the conditioned input sense voltage signal into the digital value of the conditioned input sense voltage signal, wherein the processing device at least one of comprises or is electrically coupled to the ADC.

18. The method of claim 17 further comprising:
determining, by the processing device, that a digital value of the conditioned input sense voltage signal does not exceed a percentage threshold of a digital output limit of the ADC; and
outputting, by the processing device, a gain switch signal to a gain selector of the integrator circuit to select an increased amplifier gain setting for the integrator circuit; and
switching, by the gain selector of the integrator circuit, to an increased amplifier gain setting for the integrator circuit in response to the processing device outputting the gain switch signal.

19. A digital continuity sensor for a welder comprising:
a tracer signal injector configured to electrically couple to electrodes of a welder and configured to inject a tracer signal across the electrodes;
an integrator circuit configured to:
electrically couple to the electrodes of a welder;
receive an input sense voltage signal corresponding to the tracer signal across the electrodes;
perform an integration on the input sense voltage signal; and
output an integration signal;

a root mean square (RMS) converter electrically coupled to the integrator circuit, the RMS converter configured to:
receive the integration signal; and
convert the received integration signal to output a conditioned input sense voltage signal indicative of a power level of the input sense voltage signal;
a processing device at least one of comprising or electrically coupled to an analog-to-digital converter (ADC), an input of the ADC electrically coupled to the output of the RMS converter to receive the conditioned input sense voltage signal, the ADC configured to generate a digital value of the conditioned input sense voltage signal, the processing device at least one of comprising or electrically coupled to a memory, the processing device configured to:
receive a weld cycle initiation signal indicating an initiation of a weld cycle;
sample a digital value of the conditioned input sense voltage signal as a digital baseline measured value in response to receiving the weld cycle initiation signal;
store the digital value of the conditioned input sense voltage signal as a digital baseline measured value in the memory;
output a signal to enable the welder to apply a first force to the electrodes to move the electrodes together from an initial starting position;
wait a period of time after sampling the digital value of the conditioned input sense voltage signal as the digital baseline measured value;
perform a sampling process while the welder applies the first force to the electrodes and after waiting the period of time, the sampling process comprising:
sampling a current digital value of the conditioned input sense voltage signal;
calculating a digital difference between the current digital value of the conditioned input sense voltage and the digital baseline measured value; and
determining whether the digital difference exceeds a digital threshold change value;
in response to determining that the digital difference exceeds the digital threshold change value:
output an activated weld control start permissive signal, the activated weld control start permissive signal to enable the welder to apply a welding current to the electrodes; and
output an activated high welding force signal to enable the welder to apply a welding force to the electrodes, the welding force being greater than the first force; and
in response to determining that the digital difference does not exceed the digital threshold change value:
repeating the sampling process and maintaining a current inactivated state of the weld control start permissive signal to prevent the welder from applying the welding current to the electrodes;
determining, by the processing device, that a time since receiving the weld cycle initiation signal has exceeded a maximum set detect time;
initiating, by the processing device, a timeout fault to prevent the processing device from outputting the activated weld control start permissive signal to prevent the welder from applying the welding current to the electrodes; and
outputting a signal to cause the electrodes to open toward their initial starting position in response to determining that a time since receiving the weld cycle initiation signal has exceeded the maximum set detect time.

20. The digital continuity sensor of claim 19, wherein the processing device is further configured to:
resample and store the digital value of the conditioned input sense voltage signal as an updated digital baseline measured value every time the processing device receives a weld cycle initiation signal.

* * * * *